US005659386A

United States Patent [19]
Yamada

[11] Patent Number: 5,659,386
[45] Date of Patent: Aug. 19, 1997

[54] IMAGE RECORDING APPARATUS WITH MEANS FOR INDEPENDENTLY DESIGNATING A RECORDING COLOR MODE

[75] Inventor: Masanori Yamada, Inagi, Japan

[73] Assignee: Canon Kabushiki Kaisha, Tokyo, Japan

[21] Appl. No.: 364,229

[22] Filed: Dec. 27, 1994

[30] Foreign Application Priority Data

Dec. 29, 1993 [JP] Japan .................... 5-350243

[51] Int. Cl.⁶ .................................. G03G 15/01
[52] U.S. Cl. ............................. 399/194; 399/39
[58] Field of Search ................. 355/244, 319, 355/326 R, 327

[56] References Cited

U.S. PATENT DOCUMENTS 3,960,445  6/1976  Drawe ........................ 355/326 R
4,476,486  10/1984  Ayata et al. ..................... 358/78
4,943,833  7/1990  Fukushima .................... 355/326 R
4,980,780  12/1990  Tanaka ........................... 358/401
4,992,827  2/1991  Kobayashi et al. ............. 355/202
5,070,374  12/1991  Murahashi et al. ............ 355/326 R
5,162,859  11/1992  Hirono et al. ................. 355/327 X
5,281,998  1/1994  Douglas et al. ................. 355/202
5,347,351  9/1994  Morita et al. ................ 355/326 R X
5,481,353  1/1996  Hicks et al. ................. 355/326 R X Primary Examiner—Nestor R. Ramirez
Attorney, Agent, or Firm—Fitzpatrick, Cella, Harper & Scinto

[57] ABSTRACT

For enabling efficient two-side recording of images from plural image sources, there is provided a recording apparatus with plural image input devices for respectively entering image signals, a recording unit for recording images of the image signals entered from the plural image input devices, respectively on first and second sides of a recording medium, and a manual designation unit for setting the color mode of the image to be recorded by the recording unit, independently for each of the first and second sides.

25 Claims, 22 Drawing Sheets

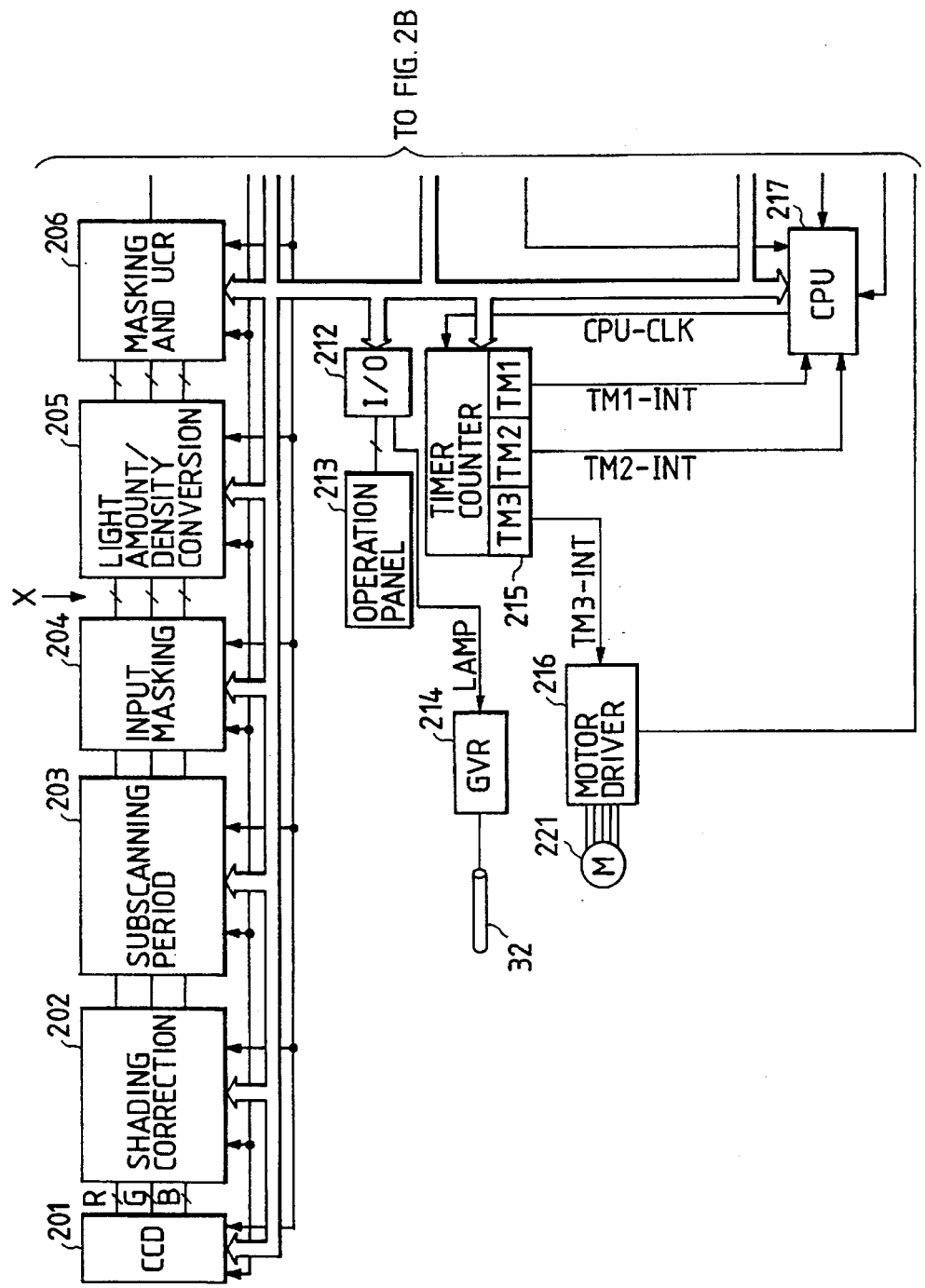

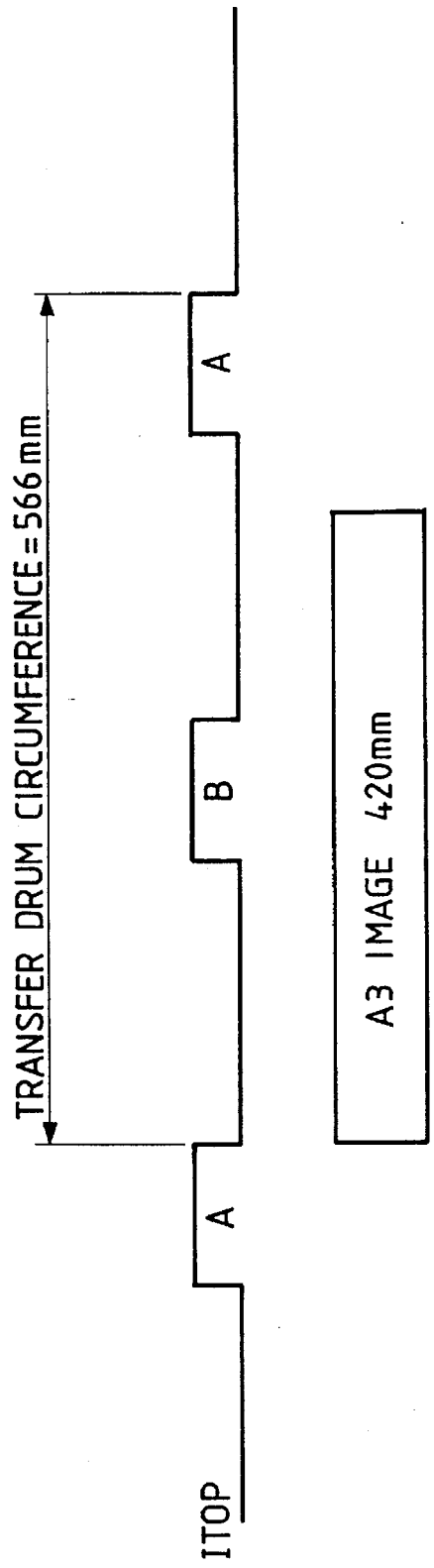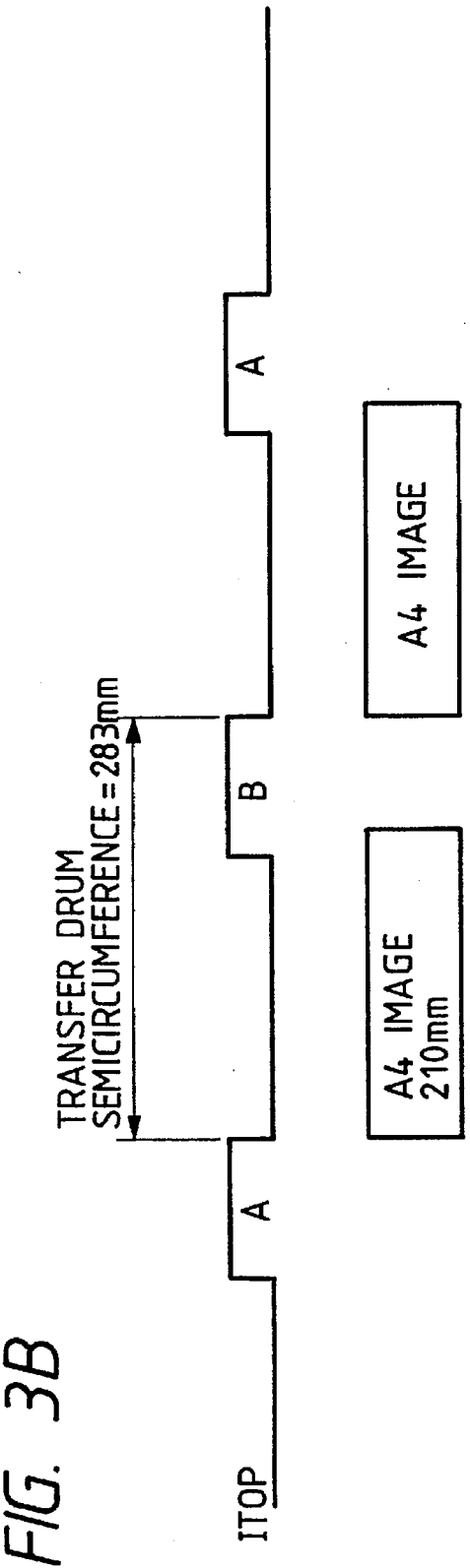

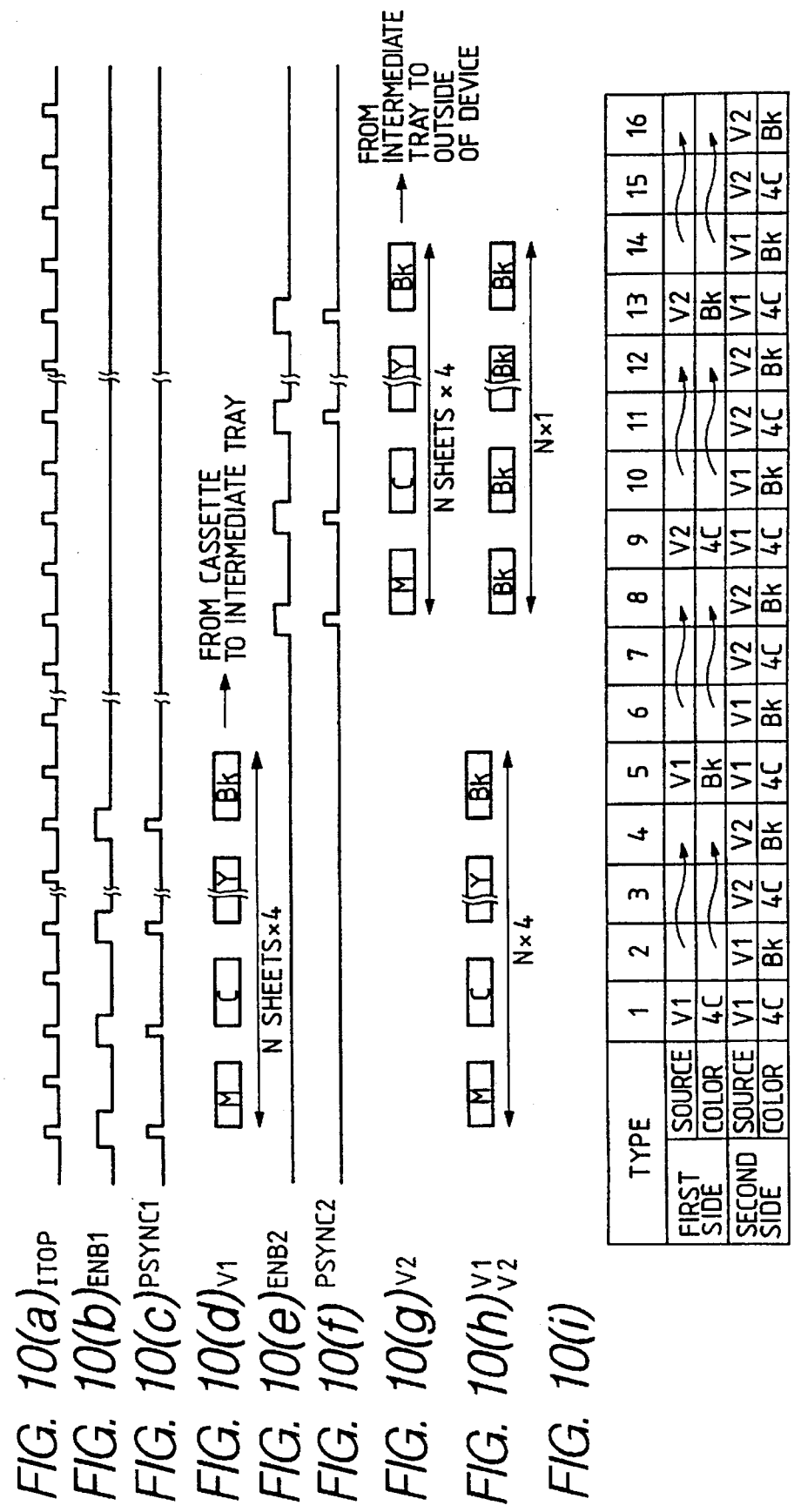

FIG. 11

| COMMAND NAME | ADDITION COMMAND STRUCTURE |
|---|---|
| COLOR MODE DESIGNATION<br>01HEX | [O][O][O][O][X][X][X][X]<br>                — Bk<br>            — Y   } 0: UNUSED<br>        — C     1: USED<br>    — M |
| SHEET SUPPLY SOURCE DESIGNATION<br>02HEX | [O][O][O][X][X][X][X][X]<br>          — HAND-FEEDING<br>        — ONE SHEET    } 0: UNUSED<br>      — TWO SHEETS    1: USED<br>    — THREE SHEETS<br>  — INTERMEDIATE TRAY |
| SHEET DISCHARGE PLACE DESIGNATION<br>04HEX | [O][O][O][O][O][O][X][X]<br>        — OUTSIDE OF DEVICE  } 0: UNUSED<br>      — INTERMEDIATE TRAY     1: USED |
| IMAGE SOURCE DESIGNATION<br>07HEX | [O][O][O][O][X][X][X][X]<br>         — ORIGINAL<br>       — EXTERNAL 1 } 0: UNUSED<br>      — EXTERNAL 2   1: USED<br>    — EXTERNAL 3 |
| NUMBER OF SHEETS DESIGNATION<br>08HEX | [X][X][X][X][X][X][X][X] : NUMBER OF SHEETS |
| START<br>80HEX | NONE |
| STOP<br>83HEX | NONE |
| STATUS REQUEST<br>40HEX | NONE |

FIG. 12

FIRST BYTE (WHOLE STATUS)

| bit7 | 1: COMMAND ACCEPTED, 0: COMMAND NOT ACCEPTED |
|---|---|
| bit6 | 1: PRINTER OPERATING, 0: NONOPERATING |
| bit5 | 1: READER OPERATING, 0: NONOPERATING |
| bit4 | 1: PRINTER BEING INITIALIZED, 0: INITIALIZATION COMPLETED |
| bit3 | 1: READER BEING INITIALIZED, 0: INITIALIZATION COMPLETED |
| bit2 | 1: PRINTER ERROR, 0: NONE |
| bit1 | 1: READER ERROR, 0: NONE |
| bit0 | |

SECOND BYTE (SHEET PRESENCE/ABSENCE INFORMATION)

| bit7 | |
|---|---|
| bit6 | |
| bit5 | |
| bit4 | 1: HAND-FEEDING SHEET PRESENT, 0: NO SHEET |
| bit3 | 1: FIRST STAGE SHEET PRESENT, 0: NO SHEET |
| bit2 | 1: SECOND STAGE SHEET PRESENT, 0: NO SHEET |
| bit1 | 1: THIRD STAGE SHEET PRESENT, 0: NO SHEET |
| bit0 | 1: INTERMEDIATE TRAY SHEET PRESENT, 0: NO SHEET |

| | |
|---|---|
| THIRD BYTE | HAND-FEEDING SHEET SIZE CODE |
| FOURTH BYTE | FIRST STAGE SHEET SIZE CODE |
| FIFTH BYTE | SECOND STAGE SHEET SIZE CODE |
| SIXTH BYTE | THIRD STAGE SHEET SIZE CODE |
| SEVENTH BYTE | INTERMEDIATE TRAY SHEET SIZE CODE |
| EIGHTH BYTE | ERROR DETAILS |
| ⋮ | |
| MTH BYTE | ERROR DETAILS |

FIG. 13

| STEP | EXTERNAL DEVICE | | RECORDING DEVICE |
|---|---|---|---|
| S1 | COLOR MODE DESIGNATION | 01HEX+0FHEX → <br> ← 80HEX | |
| S2 | SHEET SUPPLY SOURCE DESIGNATION | 02HEX+08HEX → <br> ← 80HEX | |
| S3 | SHEET DISCHARGE PLACE DESIGNATION | 04HEX+02HEX → <br> ← 80HEX | |
| S4 | IMAGE SOURCE DESIGNATION | 07HEX+01HEX → <br> ← 80HEX | |
| S5 | NUMBER OF SHEET DESIGNATION | 08HEX+N → <br> ← 80HEX | |
| S6 | START | 80HEX → <br> ← E0HEX | FIRST SIDE RECORDING OF BOTH-SIDE ORIGINAL IMAGE |
| S7 | STATUS REQUEST | 40HEX → <br> ← E0HEX | |
| S8 | STATUS REQUEST | 40HEX → <br> ← 80HEX | |
| S9 | COLOR MODE DESIGNATION | 01HEX+01HEX → <br> ← 80HEX | |
| S10 | SHEET SUPPLY SOURCE DESIGNATION | 02HEX+10HEX → <br> ← 80HEX | |
| S11 | SHEET DISCHARGE PLACE DESIGNATION | 04HEX+01HEX → <br> ← 80HEX | |
| S12 | IMAGE SOURCE DESIGNATION | 07HEX+02HEX → <br> ← 80HEX | |
| S13 | NUMBER OF SHEET DESIGNATION | 08HEX+N → <br> ← 80HEX | |
| S14 | START | 80HEX → <br> ← C0HEX | SECOND SIDE RECORDING OF BOTH-SIDE EXTERNAL IMAGE |
| S15 | | PSYNC2 <br> V2 | |
| S16 | STATUS REQUEST | 40HEX → <br> ← 80HEX+ | |

FIG. 15

| STEP | EXTERNAL DEVICE | | RECORDING DEVICE |
|---|---|---|---|
| 1 | | 40HEX → ← 80HEX+ ← OOO×××× 0B+ | BOTH-SIDE FUNCTION SETTING |
| 2 | | | COLOR MODE SETTING |
| 3 | STATUS REQUEST | | SHEET SETTING |
| 4 | | | NUMBER OF SHEETS SETTING |
| 5 | | | START KEY ON |
| 6 | STATUS REQUEST | 40HEX → ← E0HEX+ | FIRST SIDE RECORDING OF BOTH-SIDE ORIGINAL IMAGE |
| 7 | STATUS REQUEST | 40HEX → ← 80HEX ← OOO×××× 1B+ | |
| 8 | | | (REMOTE KEY ON) |
| 9 | COLOR MODE DESIGNATION | OMITTED | (COLOR MODE SETTING) |
| 10 | SHEET SUPPLY SOURCE DESIGNATION | OMITTED | ( BOTH-SIDE FUNCTION SETTING ) |
| 11 | SHEET DISCHARGE PLACE DESIGNATION | OMITTED | |
| 12 | IMAGE SOURCE DESIGNATION | OMITTED | |
| 13 | NUMBER OF SHEETS DESIGNATION | OMITTED | |
| 14 | START | OMITTED | (START KEY ON) |
| 15 | | OMITTED | SECOND SIDE RECORDING OF BOTH-SIDE EXTERNAL IMAGE |
| 16 | STATUS REQUEST | OMITTED | |

FIG. 18A

COMMAND

| COMMAND NAME | HEADER | ADDITION DATA |
|---|---|---|
| START | 80HEX | bit0: DH SYNC. |
| DH OPERATION DESIGNATION | 85HEX | bit2: COUNT OF NUMBER OF ORIGINAL |
| | | bit1: ONE SHEET DISCHARGE |
| | | bit0: ONE SHEET SUPPLY |
| DH BLANK-FEEDING DESIGNATION | 86HEX | NUMBER M OF BLANK-FEEDING SHEETS |
| DH STATUS REQUEST | 43HEX | NONE |
| REQUEST OF NUMBER OF DH ORIGINALS | 45HEX | NONE |
| AREA DESIGNATION | 0BHEX | $i, X_i, \Delta X_i, Y_i, \Delta Y_i$ |

FIG. 18B

STATUS

| DH STATUS | bit3 | 1: THERE IS ORIGINAL ON GLASS |
|---|---|---|
| | bit2 | 1: THERE IS ORIGINAL IN TRAY |
| | bit1 | 1: OPERATING |
| | bit0 | 1: ERROR |

| NUMBER OF DH ORIGINALS | NUMBER OF SHEETS |
|---|---|

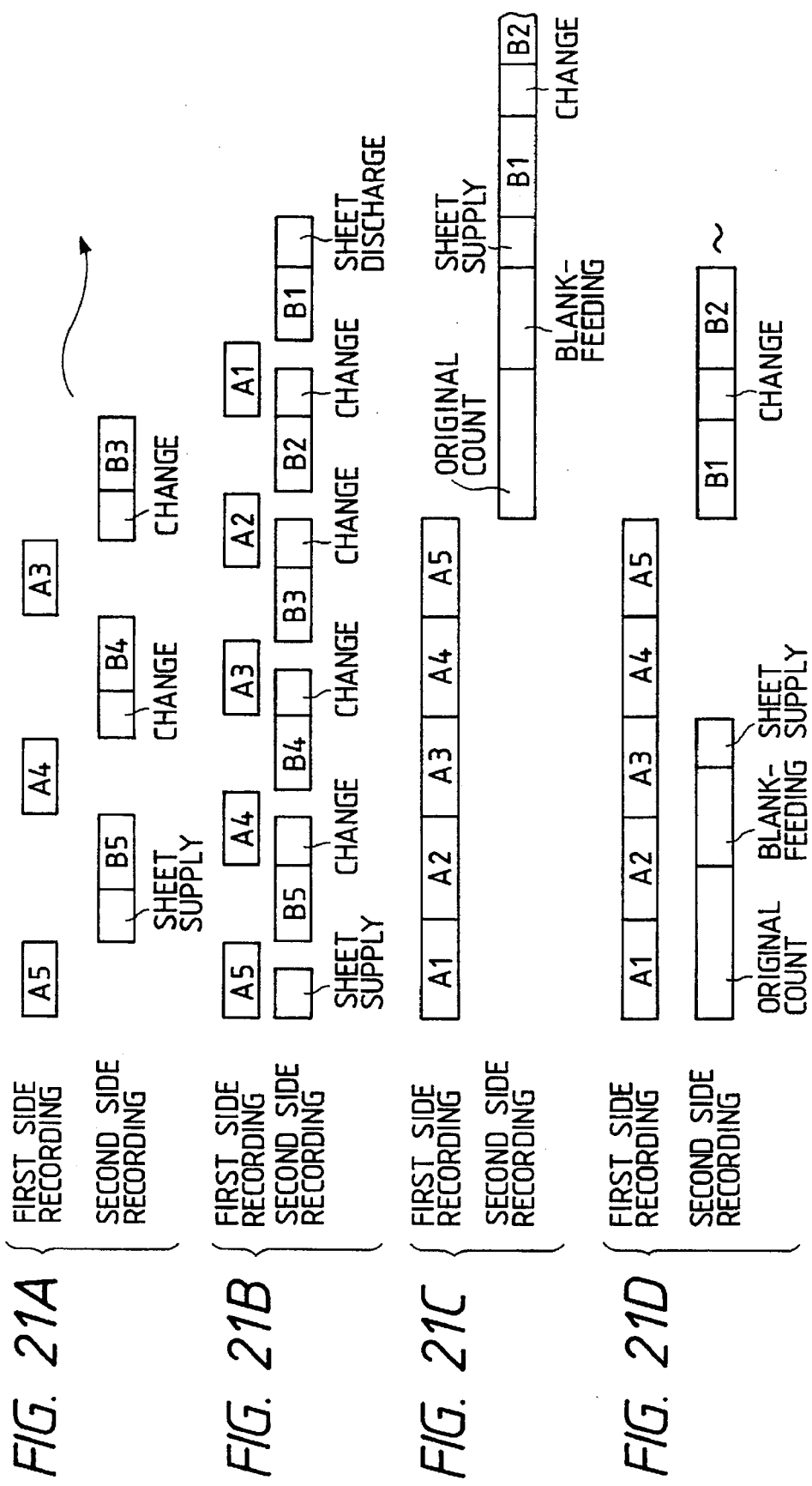

IMAGE RECORDING APPARATUS WITH MEANS FOR INDEPENDENTLY DESIGNATING A RECORDING COLOR MODE

BACKGROUND OF THE INVENTION

1. Field of the Invention

The present invention relates to an image recording apparatus, and more particularly to an apparatus for recording images from different image sources, respectively on plural sides of a recording medium.

2. Related Background Art

In the field of the above-mentioned apparatus, there is recently conceived a color copying apparatus having interface with an external equipment such as a computer. Such apparatus enables to feed and process a full-color original image in a computer, and to produce a color recording of a document image or a layout image with a graphic image prepared in the computer.

However, in order to feed a pictorial full-color image for example of A3 size into the computer with a resolving power of 400 dpi and with gradation levels of 8 bits for each of R, G and B colors, there is required an extremely large memory capacity of about 90 Mbytes. Such system is too expensive and inadequate in case the processing of a pictorial full-color image is not required or in case of forming a document of plural pages by layout of original images and computer-generated images in the unit of each page, though in-page layout is not required.

SUMMARY OF THE INVENTION

An object of the present invention is to resolve the drawback mentioned above.

Another object of the present invention is to provide an apparatus capable of recording images from plural image sources respectively on both sides of a recording medium.

The above-mentioned objects can be attained, according to an aspect of the present invention, by a recording apparatus comprising plural image input means for respectively entering image signals, recording images relating to the image signals entered from the plural image input means, respectively on first and second sides of a recording medium, and mode setting means for independently setting, for each of the sides, the color mode of the image to be recorded by the recording means.

Still another object of the present invention is to provide an apparatus convenient for use, in recording images from plural image sources on both sides of the recording medium.

The above-mentioned object can be attained, according to another aspect of the present invention, by a recording apparatus comprising:

a) plural image input means for respectively entering image signal, the plural image input means including reader means for optically reading an original image, and input means for entering said image signal from an external device;

b) recording means for recording images relating to the image signals entered from the plural image input means, respectively on first and second sides of a recording medium, wherein the recording means includes retention means for retaining a recording medium bearing an image recorded on the first side thereof, and is adapted to effect image recording on both sides of said recording medium by recording an image on the second side of the recording medium in the retention means;

c) record control means for controlling the image recording by the recording means in such a manner as to record images relating to a same image signal on the first side of plural recording media, in the unit of n ($n \geq 1$) pages, and to record images relating to a same image signal on the second sides of the plural recording media in the retention means, in the unit of n pages; and d) mode setting means for independently setting, for each of the sides, the color mode of the image to be recorded by said recording means;

wherein the mode setting means is capable of varying the color mode in the unit of the n pages.

Still other objects of the present invention, and the features thereof, will become fully apparent from the following detailed description of the embodiments, to be taken in conjunction with the attached drawings.

BRIEF DESCRIPTION OF THE DRAWINGS

FIGS. 2A and 2B, when combined as shown in FIG. 2, show a block diagram of an image processing circuit;

FIGS. 3A and 3B are schematic views showing an example of the timing for forming two-sheet images;

FIG. 10($a$) to 10($i$) is a view showing an example of the image forming sequence in an embodiment of the present invention;

FIG. 11 is a table of communication commands;

FIG. 12 is a view showing status signals;

FIG. 13 is a view showing an example of the communication protocol;

FIG. 15 is a view showing an example of the communication protocol in another embodiment;

FIGS. 18A and 18B are tables of communication commands/status signals;

FIGS. 21A to 21D are timing charts showing an example of timing of the original handling.

DETAILED DESCRIPTION OF THE PREFERRED EMBODIMENTS

Now the present invention will be clarified in detail by embodiments thereof shown in the attached drawings.

Figure 1:
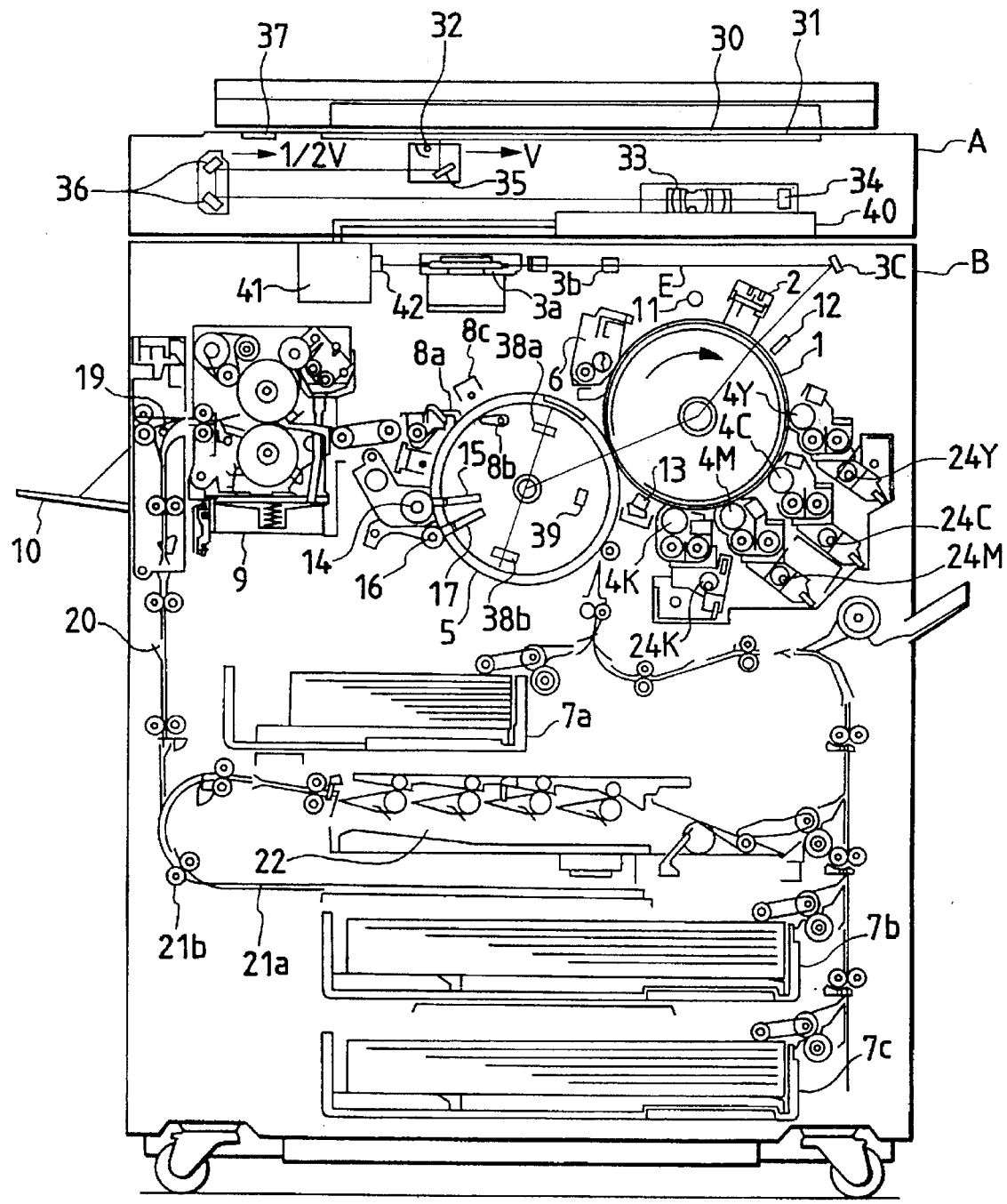
FIG. 1 is a view showing the configuration of a color copying apparatus constituting an embodiment of the present invention.

FIG. 1 is a schematic longitudinal cross-sectional view of a color image forming apparatus, constituting a first embodiment of the present invention and composed of a digital color image reader unit A in the upper part and a digital color image printer unit B in the lower part.

In the reader unit A, an original 30 is placed on an original supporting glass 31 and is scanned with an exposure lamp 32, whereby the light reflected from the original 30 is guided by mirrors 35, 36 and focused by a lens 33 onto a full-color sensor 34 to provide color-separated image signals, which are guided through an unrepresented amplifying circuit, then processed in an image processing circuit 40 to be explained later and supplied to the printer unit B.

In the printer unit B, a photosensitive drum 1, constituting an image bearing member, is supported rotatably in a direction indicated by an arrow, and, around said photosensitive drum 1, there are provided a pre-exposure lamp 11, a corona charger 2, a laser exposure optical system 3, a potential sensor 12, four developing units 4Y, 4C, 4M, 4K of different colors, on-drum light amount detection means 13, a transfer drum 5 and a cleaning unit 6.

In the laser exposure optical system 3, the image signals from the reader unit are converted into a light signal by a laser output unit 41, and a laser beam emitted from a laser 42 is reflected by a polygon mirror 3a, then guided by a lens 3b and a mirror 3c, and projected onto the photosensitive drum 1.

At the image formation in the printer unit B, the photosensitive drum 1 is rotated in the direction of the arrow and is uniformly charged by the charger 2 after the charge elimination by the pre-exposure lamp 11, and a latent image is formed by the irradiation of a light image E for each separated color.

Then a predetermined developing device is activated to develop the latent image on the photosensitive drum 1, thereby forming, on the photosensitive drum 1, a toner image principally composed of a resinous material. The developing devices are selectively brought close to the photosensitive drum 1, according to the respective separated colors, by the function of eccentric cams 24Y, 24C, 24M, 24K.

Subsequently the toner image on the photosensitive drum 1 is transferred onto a recording material, supplied to a position opposed to said photosensitive drum 1, from a recording material cassette 7 through a transport system and a transfer device 5. The transfer drum 5 is rotatably supported, and bears a recording material supporting sheet, composed of a dielectric material and supported cylindrically on the peripheral apertures thereof. Along with the rotation of the transfer drum 5, the toner image present on the photosensitive drum 1 is transferred by means of an unrepresented charger and a roller, whereby color images of a desired number are transferred onto the recording material supported on the recording material supporting sheet, thereby forming a full-color image.

In case of full-color formation, after the transfer of the four color toner images, the recording material is separated from the transfer drum 5 by the function of a separating finger 8a, a separating roller 8b and a separating charger 8c and is discharged, through a heat roller fixing unit 9, to a tray 10.

On the other hand, the photosensitive drum 1 after the image transfer is subjected to the removal of the remaining toner by the cleaning unit 6, and is used again in the image forming process.

In case of forming images on both sides of the recording material, after the recording material is discharged from the fixing device 9, a transport path switching guide 19 is activated to guide the recording material through a vertical transport path 20 to an inverting path 21a. Then an inverting roller 21b is reversed to discharge the recording material in a direction opposite to that at the entry, with the trailing end at the entry moving as the front end, and to store the recording material in an intermediate tray 22. Thereafter an image is formed on the other side, by the above-explained image forming process.

For avoiding the powder scattering on the recording material supporting sheet of the transfer drum 5 and the oil deposition onto the recording material, cleaning operation is conducted with a fur brush 14 and a back-up brush opposed thereto across the recording material supporting sheet, and also with an oil eliminating roller 16 and a back-up brush 17 opposed thereto across the recording material supporting sheet. Such cleaning operation is conducted before or after the image formation, and also in case sheet jamming is developed.

An image front end sensor 39 generates an image front end signal ITOP when a signal plate 38a or 38b passes in front of the sensor. The plates 38a, 38b are in mutually opposed positions, whereby the ITOP signal is generated twice in a turn of the transfer drum 5.

Figure 2B:
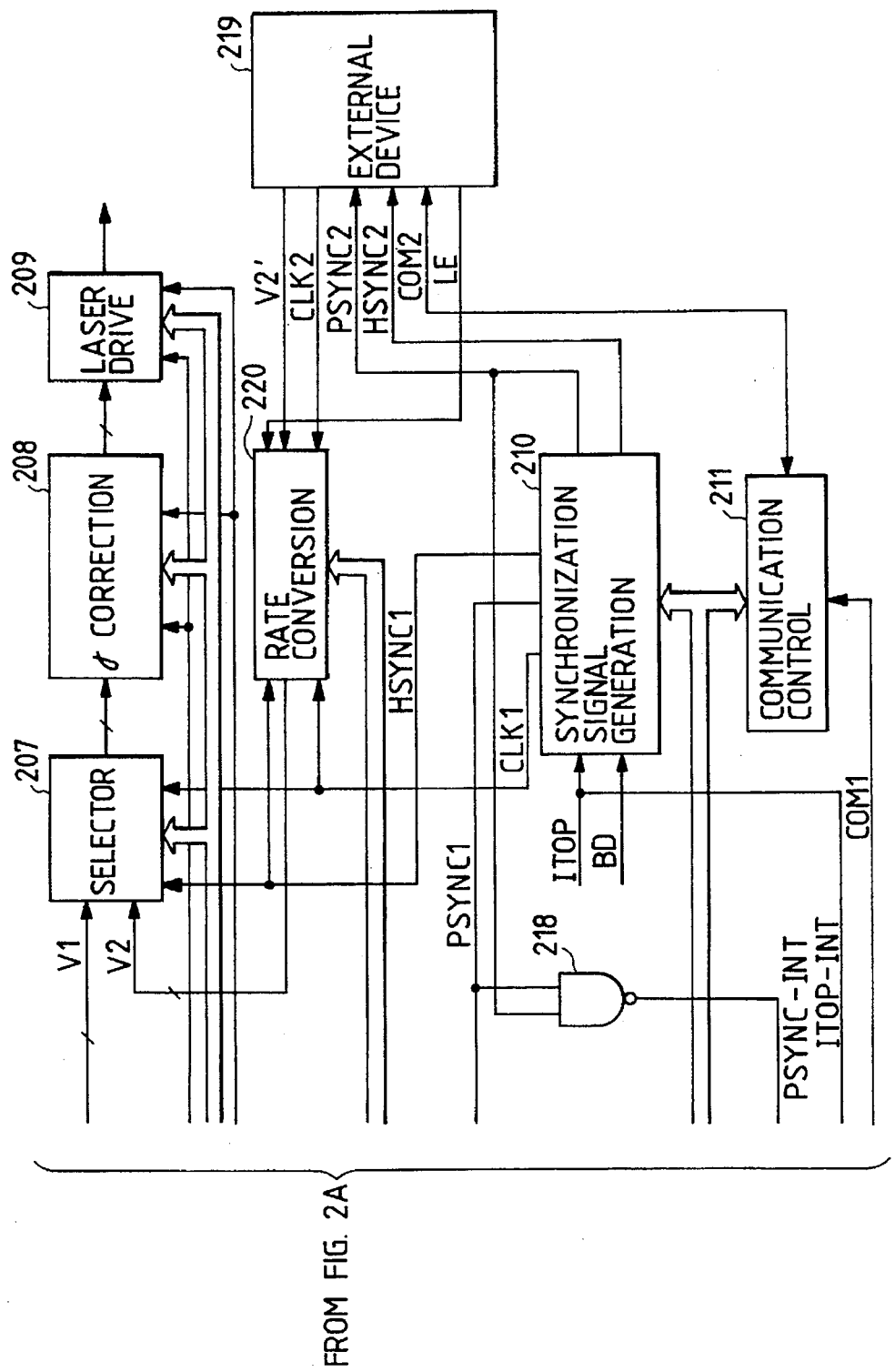

FIGS. 2A and 2B are block diagrams of an image processing circuit 40 shown in FIG. 1. Image signals obtained by photoelectric conversion in the CCD 34 shown in FIG. 1 are subjected to gain control and offset adjustment in a CCD process unit 201, and are converted, by an A/D converter, into R, G, B digital image signals of 8 bits for each color. The image signals are supplied to a shading correction unit 202 for known shading correction for each color, utilizing a signal obtained by reading a standard white board 37 shown in FIG. 1. As the R, G and B colors are mutually separated by a predetermined distance on the light-receiving unit of the CCD 34, the spatial aberration in the sub scanning direction is compensated by a sub-scanning synchronization process unit 203 composed of line-delay elements.

An input masking unit 204 corrects the turbidity etc. in the R, G, B filters. A light amount/density conversion unit 205, composed of a look-up table ROM (or RAM), converts the luminance signals R, G, B into density signals C, M, Y. A known masking/UCR circuit 206 generates, from the entered three primary color signals Y, M, C, a signal V1 among the Y, M, C and Bk signals with a predetermined bit length, for example 8 bits, at each reading operation. A selector unit 207, for selecting the image signal to be recorded, switches the image signal V1 from the CCD and the image signal V2 from an external device 219 at an arbitrary timing. A known gamma correction unit 208 effects the image recording with desired density and gradation, according to the characteristics of the printer. A laser drive unit 209 drives the laser by converting the digital image signal for example into a pulse modulated analog signal. A CPU 217 controls, through a motor driver 216, a motor 221 for reciprocating an optical system consisting of the lamp 32 and the mirrors 35, 36, also effects light amount control and on/off control of the original illuminating lamp 32 through a CVR 214, and controls an operation panel 213 through an I/O unit 212. The CPU 217 contains known devices such as RAM and ROM. A communication control unit 211 effects communication with the motor driver 216 and the external device 219. It receives, from the external device, the information on the sheet size, color mode etc. for image signal recording and recording end/start commands, and it supplies the external device with the status of the reader unit and the printer unit. A synchronization signal generation unit 210 generates a pixel-unit clock signal CLK1, line synchronization signals HSYNC1, HSYNC2, and page-unit synchronization signals PSYNC1, PSYNC2, based on the ITOP signal generated in synchronization with the rotation of the transfer drum 5 and a BD signal generated in synchronization with the rotation of the polygon mirror. A speed conversion unit 220 converts an image signal V2', transmitted from the external device in synchronization with the pixel clock signal CLK2 and an image effective section signal LE, into an image signal V2 synchronized with the internal pixel clock CLK1 and the line synchronization signal HSYNC1.

A counter 215 is provided with three counters for counting desired numbers of clock signals CPU-CLK from the CPU, for generating interruption signals TM1-INT, TM2-INT, TM3-INT for the CPU 217 and for the motor driver 216 as will be explained later.

FIGS. 3A and 3B show the relationship between the ITOP signal and the image. A transfer drum with a diameter of ca. 180 mm has a periphery of ca. 566 mm. The recording sheet is electrostatically adhered to the transfer drum, and the ITOP signal is generated, as already explained before, at every half periphery or 283 mm. As shown in FIG. 3A, an A3-sized image with a sub scanning length of 420 mm can be formed over the periphery of said transfer drum, so that every other ITOP signals are used as the synchronization signals. Also on the periphery of the transfer drum there can be formed two A4-sized images with a sub-scanning length of 210 mm, as shown in FIG. 3B, so that the process speed can be doubled in comparison with the case of A3-sized image. The operation of adhering two sheets of a predetermined size on the transfer drum will be hereinafter called "two-sheet adhesion" and that of adhering only one sheet will be called "one-sheet adhesion". Also the positions of adhesion of the two sheets will be respectively called "side A" and "side B".

In the present embodiment, the ITOP signal for page synchronization is subjected to gate control, for separate control of the situations shown in FIGS. 3A and 3B, and also for selection of plural image sources.

Figure 4:
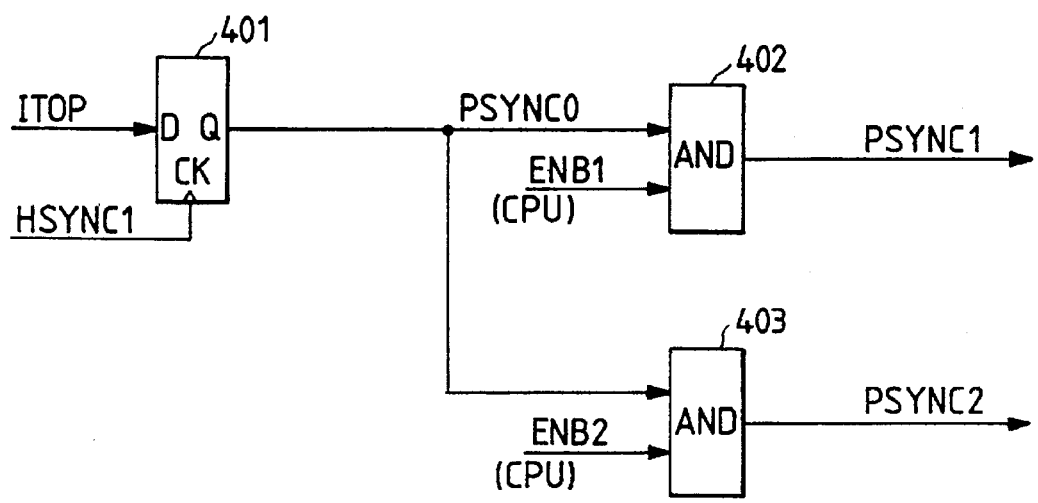
FIG. 4 is a block diagram of a synchronization signal generation unit 210.
Figure 5:
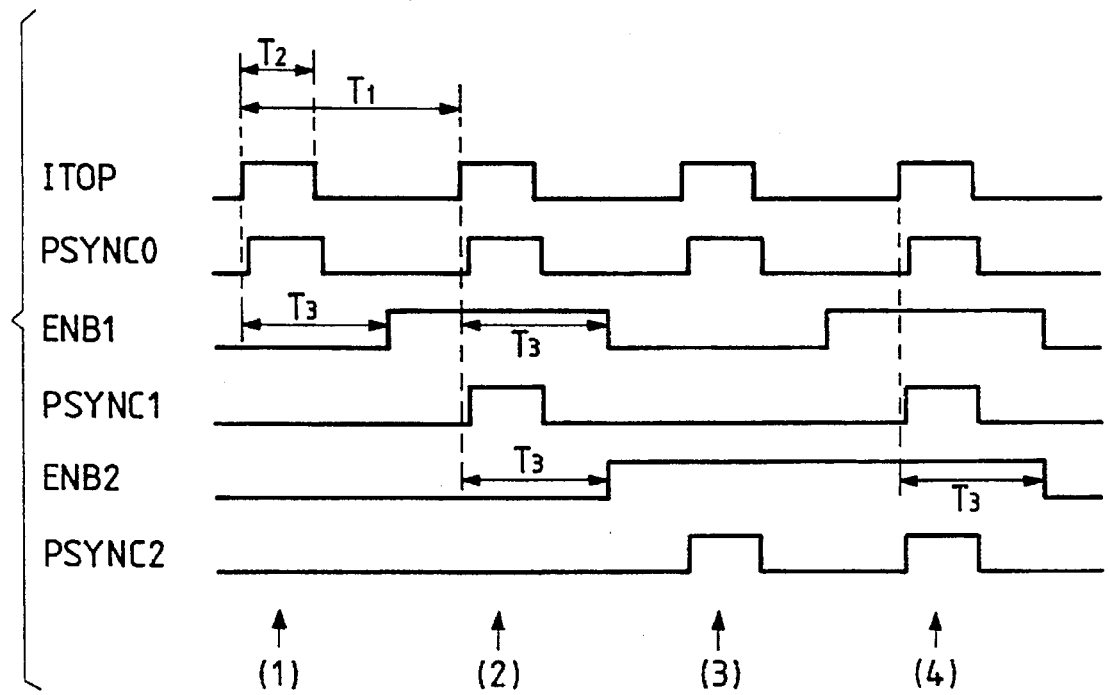
FIG. 5 is a timing chart showing an example of the timing of the functions thereof.

FIG. 4 shows the configuration of the synchronization signal generation unit 210 for generating the page synchronization signals PSYNC1, PSYNC2, and FIG. 5 shows an example of the function timing thereof. The SYNC1 signal is used for the image from the CCD 201, namely in the local copying operation, while the PSYNC2 signal is used for recording the image from the external device, namely in the remote print operation. The ITOP signal, generated in synchronization with the rotation of the transfer drum 5, is supplied into a flip-flop 401 and synchronized with the line synchronization signal HSYNC1 to generate a signal PSYNC0, which is subjected to logic multiplication in AND gates 402, 403 respectively with enable signals ENB1, ENB2 from the VPU 217, thereby generating the signals PSYNC1, PSYNC2. The enable signals ENB1, ENB2 are gate signals for the PSYNC0 signal, and are turned on or off after a time T3 from the ITOP signal. The time T3, longer than the positive logic period T2 of the PSYNC0 signal but shorter than the period T1 of the ITO signal, is counted by a counter TM2 from the upshift of the ITOP signal and is secured by an interruption signal TM2-INT to the CPU 217. The four states (1), (2), (3) and (4) shown in FIG. 5 and obtained by the combinations of the presence or absence of the PSYNC1 and PSYNC2 signals can be arbitrarily obtained by the control of the enable signals ENB1, ENB2 by the CPU 217.

Figure 6:
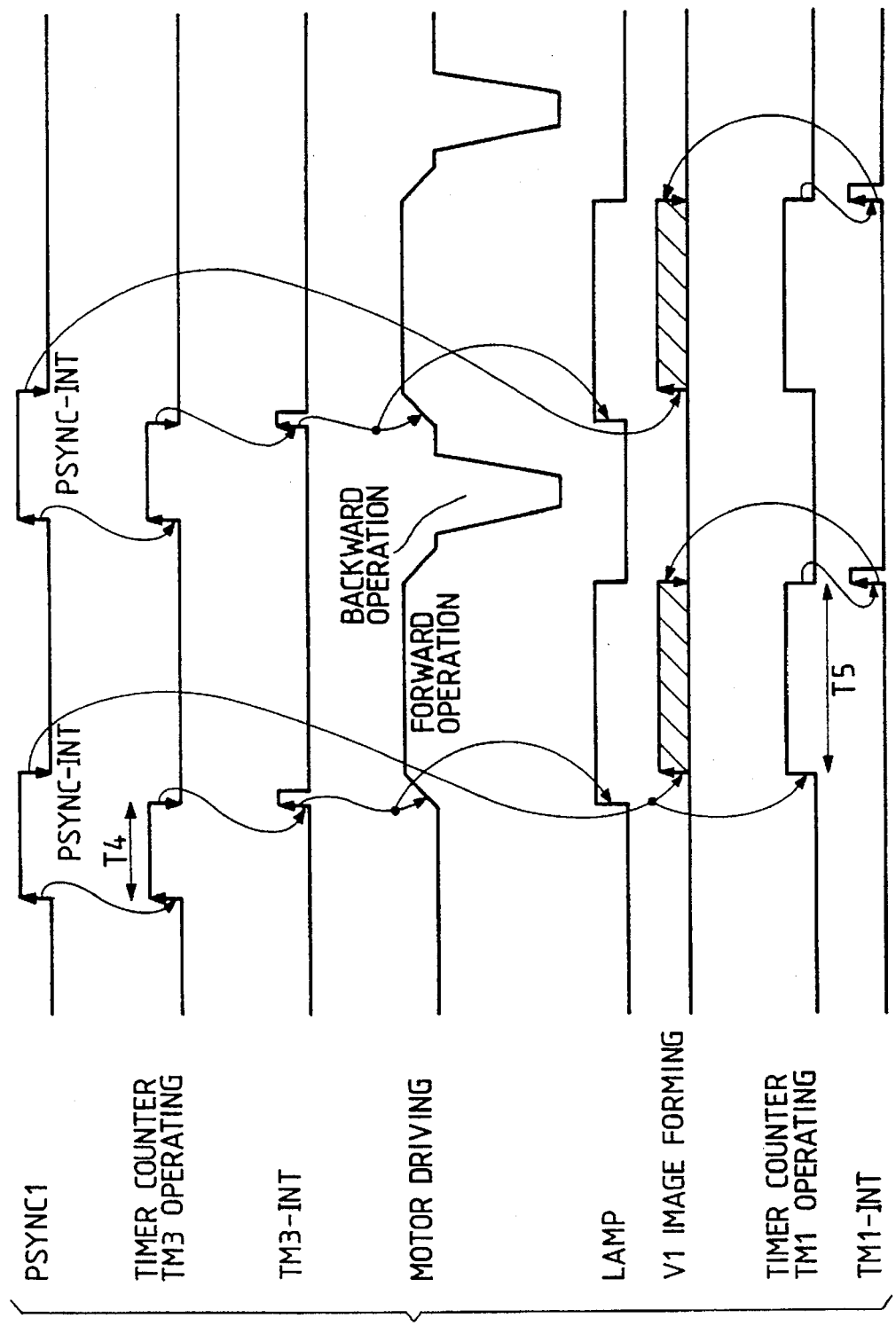
FIG. 6 is a view showing an example of the motor/lamp control sequence in the local copying operation.

FIG. 6 shows the sequence of the local copying operation, particularly the control sequence for the motor 221 for driving the optical system consisting of the lamp 32 and the mirrors 35, 36, and for on/off control of the lamp 32. A counter TM3 starts counting simultaneously with the upshift of the page synchronization signal PSYNC1 for the local copying, and sends an interruption signal TM3-INT to the driver 216 after the counting of a time T4, whereupon the motor 221, or the optical system, starts with a predetermined acceleration, then moves with a constant speed after a desired speed is reached, and, after movement of a predetermined distance, decelerates same as the acceleration at the start. After stopping, it starts a reverse motion to return to the start position, then stops and awaits the TM3-INT signal for next scanning.

The lamp 32 is also turned on in synchronization with the TM3-INT signal. The downshift of the PSYNC1 signal is utilized, as shown in FIGS. 2A and 2B, as an interruption signal SPYNC-INT to the CPU 217, and the image formation based on the image signal V1 is initiated in synchronization with the signal. Also a counter TM1 counts an image section time T5 from the signal PSYNC-INT, and a counting end signal TM1-INT executes an interruption to terminate the image formation with a desired length, whereby the lamp is turned off.

Figure 7:
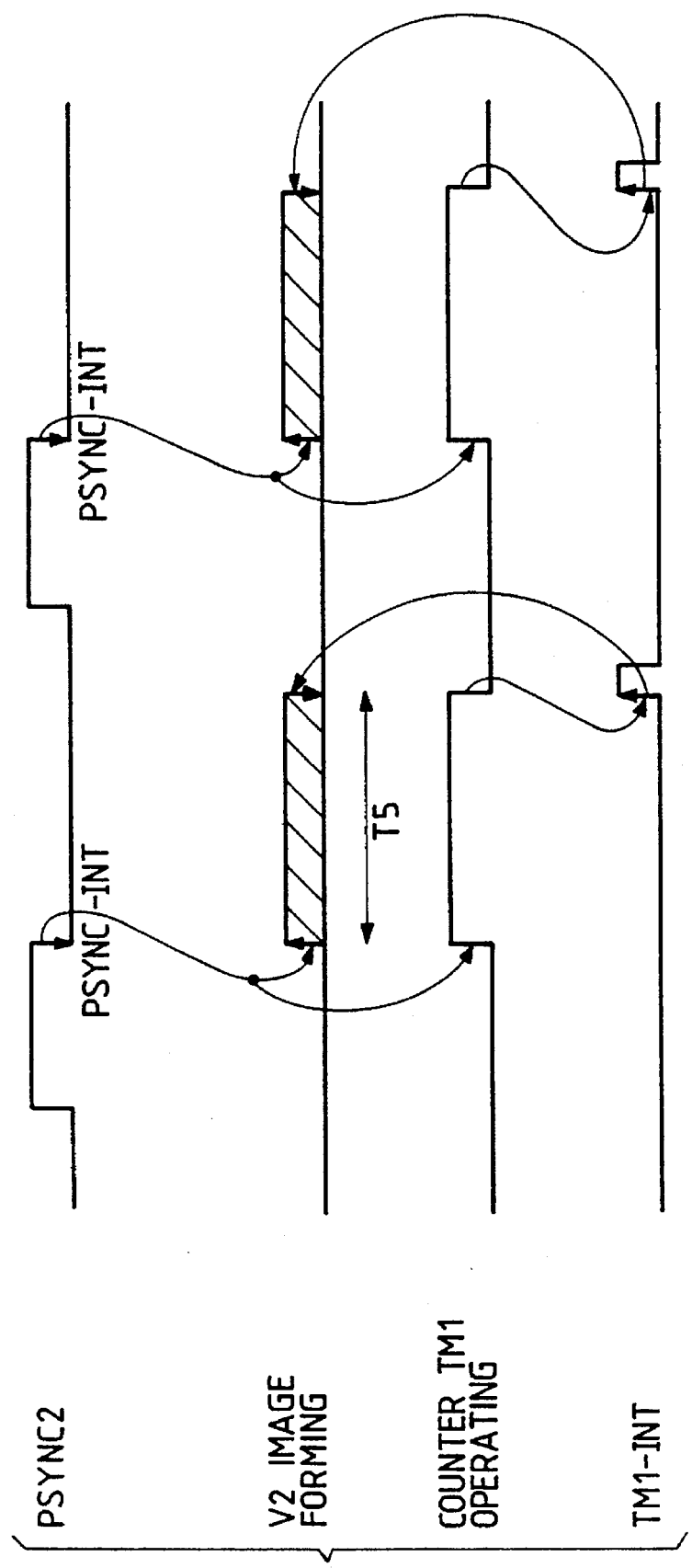
FIG. 7 is a view showing an example of the remote print image forming sequence.

FIG. 7 shows the relationship between the page synchronization signal PSYNC2 and the image formation in the remote print operation. For the image from the external device, the accelerating time of the motor and the start-up of the lamp are not considered and the counter TM1 alone is used to count a desired time T5 from the signal PSYNC-INT at the downshift of PSUNC2, and the image formation is terminated by the interruption signal TM1-INT.

In the following there will be explained the concept of the functions of an embodiment of the present invention, with reference to FIGS. 8A, 8B, 9A and 9B.

Figure 8A:
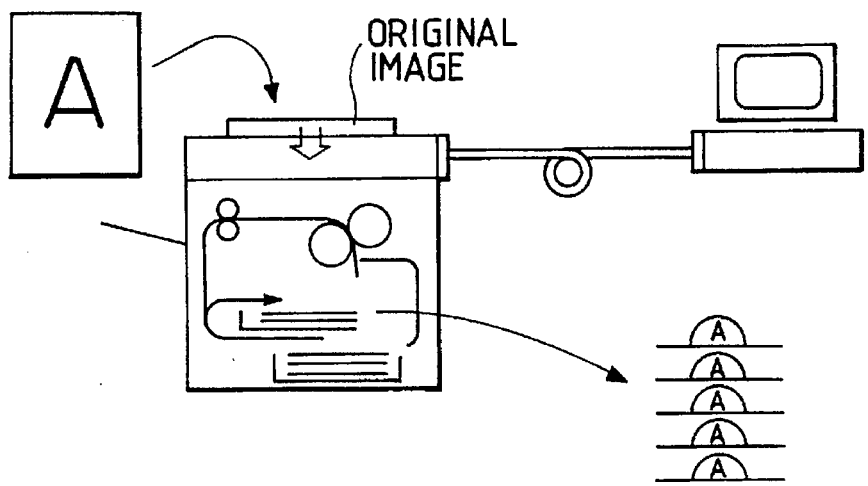
FIGS. 8A and 8B are schematic views showing the operation concept of an embodiment of the present invention.
Figure 8B:
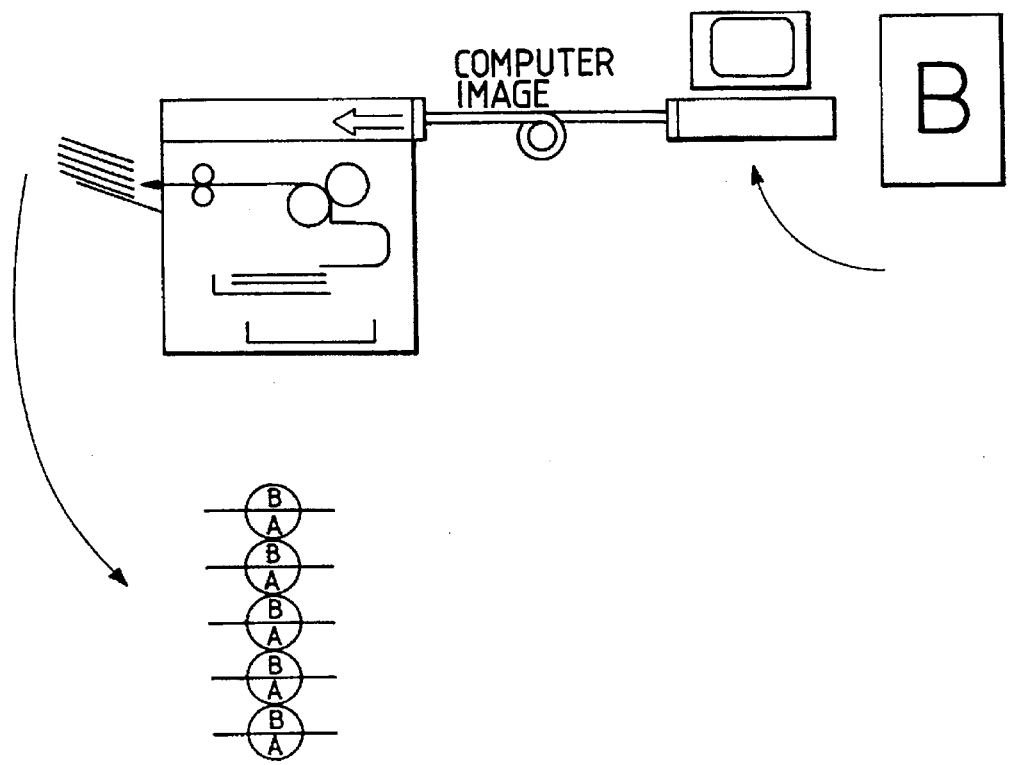
Figure 9A:
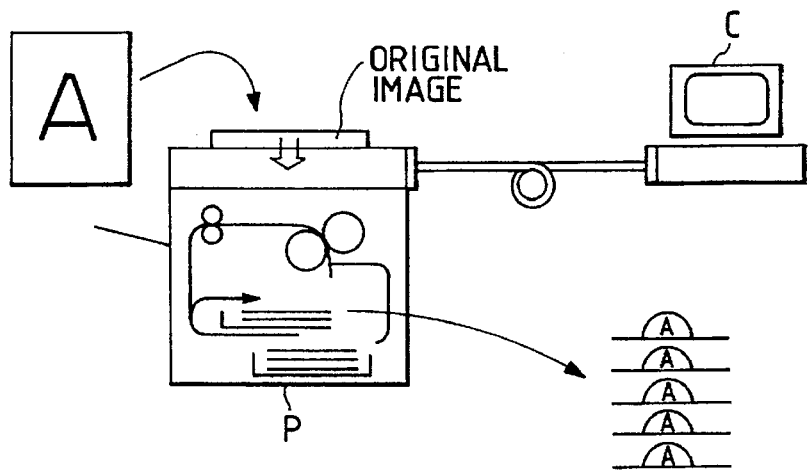
FIGS. 9A and 9B are schematic views showing another operation concept of the embodiment of the present invention.
Figure 9B:
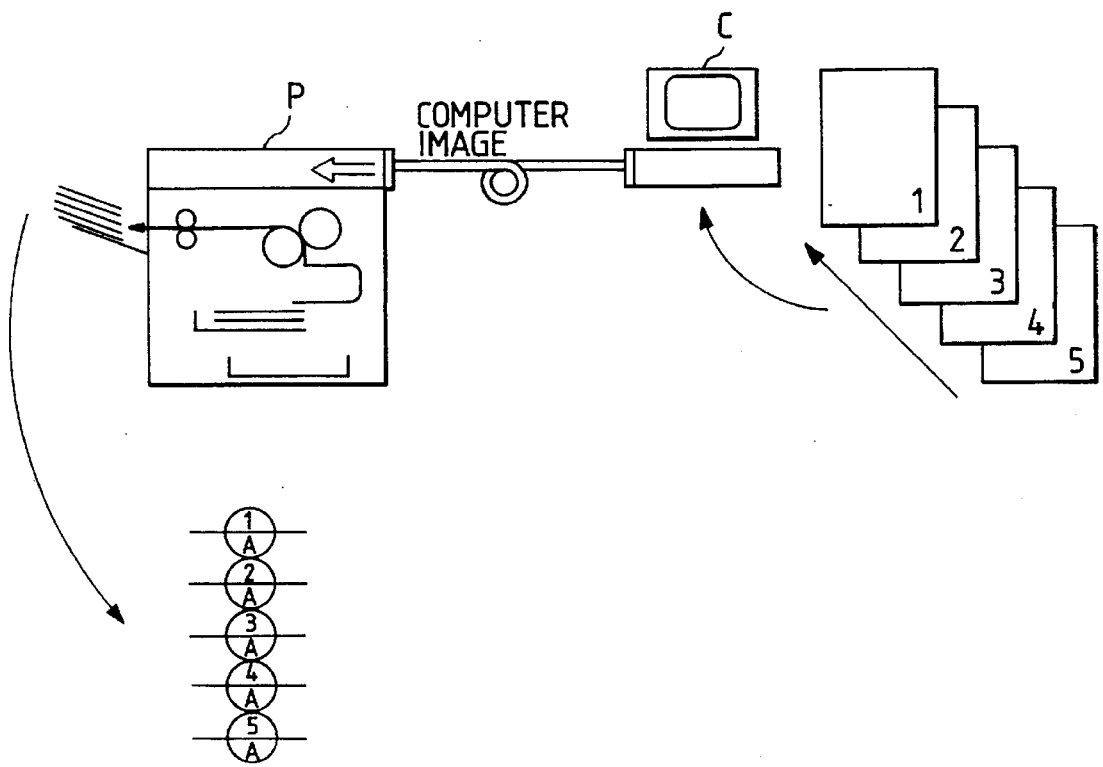

FIG. 8A shows the operation for the first side in a two-side recording. The image A of an original on the original support table is copied on a sheet supplied from an arbitrary cassette, and the sheet is stored in the intermediate tray. FIG. 8B shows the operation for the second side in the two-side recording. An image B from the external device such as a computer is recorded on the sheet, bearing the recording on the first side and supplied from the intermediate tray, and the sheet is then discharged from the apparatus. In this manner there is obtained a two-side recorded sheet, bearing the image of the external device on the top side and the image of the original on the bottom side. FIG. 9A is same as FIG. 8A. FIG. 9B shows a case in which the computer does not provide a single image but mutually different images of five pages. In this case the computer provides these pages in succession, whereby obtained are two-side recorded sheets bearing a same image of the original on the bottom side and different images from the computer on the top side. It is naturally possible also to exchange the order of recordings on the top and bottom faces.

Now reference is made to FIG. 10, for explaining the relationship between the timing of image formation and the synchronization signal for each page, in an embodiment of the present invention, and the types of two-side recording achievable in the present invention.

In FIG. 10, (d) indicates the sequence of full-color recording of an original image V1, on the first side of N recording sheets.

The recording in this case is conducted on the sheets supplied from the cassette, and the sheets are then stored in the intermediate tray 22.

In FIG. 10, (g) shows the sequence, after the above-mentioned first-side recording of the original image V1 on N sheets in the one-sheet adhesion mode and in the full-color mode, of second-face recording (on the sheets supplied from the intermediate tray and discharged subsequently from the apparatus) of the image V2 from the external device on N sheets in the full-color mode. During the first-side recording, as shown in (a)–(c), every other ITOP signals are gated by the ENB1 signal to generate the PSYNC1 signals, and, during the second-face recording, as shown in (e) and (f), the PSYNC2 signals are generated by the ENB2 signals. Image formations of N×4 times are conducted for each of the first and second sides. In FIG. 10, (h) shows a case in which, in a state shown in (g), monochromatic recording is conducted on the second side. The synchronization signal control chart for this case is not shown. In this case there are only required N image formations for the second side. For two image sources V1 and V2, and for two development modes of full-color and monochromatic, there can be considered 16 types (color modes) for the two-side recording, as shown in (i). The types 1, 2, 5, 6, 11, 12, 15 and 16 are based on a same image source for both sides. The types 3, 4, 7, 8, 9, 10, 13 and 14 are based on different image sources respectively for the top and bottom sides, and the types 4, 7, 10 and 13 have different color modes for the top and bottom sides.

FIGS. 11 and 12 show, among the commands from the external device and the status signals returned from the recording apparatus, embodying the present invention, for realizing the communication protocol between such external device and the recording apparatus, those required for realizing the present invention. In the following there will be explained the above-mentioned communication protocol, with reference to FIGS. 11 and 12. In the present embodiment, the communication is conducted in 8-bit serial communication. FIG. 11 shows the examples of commands, each consisting of a header and additional data. For example, for designating a color mode for recording, the external device supplies the recording apparatus with a header "01HEX" followed by a data byte in which the development colors to recorded are assigned for respective bits. The additional data are, for example, "0FHEX" for full-color recording and "01HEX" for monochromatic recording. A sheet supply source designation command (header "02HEX") designates the source of supply of the sheet for recording, and a sheet discharge place designation command (header "04HEX") designates the place of discharge of the sheet after recording. For example, the "02HEX" header followed by "04HEX" and the "04HEX" header followed by "02HEX" designate the sheet flow from a second cassette to the intermediate tray, corresponding namely to the first side recording in two-side recording. Also "02HEX"+"10HEX" and "04HEX"+"01HEX" indicate the sheet discharge from the intermediate tray to the outside, corresponding namely to the second side recording in two-side recording. Also "02HEX"+"01HEX" and "04HEX"+"01HEX" indicate the one-side recording by hand-feed sheet. An image source designation command selects the kind of the image to be recorded, namely the original image or the image from the external device such as a computer, and consists of a "07HEX" header and additional data in which image sources are assigned to their bits. "07HEX"+"01HEX" designates an operation as a copying machine, and "07HEX"+"02HEX" designates an operation as a printer. There may also be designated plural sources as the external image source. A sheet number designation command consists of a "08HEX" header and sheet number data and is used for designating the number of recording sheets. In case the number of recordings is not fixed in advance, it is possible to designate a sufficiently larger sheet number and to interrupt the operation, when necessary, by a stop command to be explained later. After the content of the operation is designated by the above-mentioned commands, the operation is initiated by a start command "80HEX". Interruption of the operation as mentioned above is achieved by a stop command "83HEX". A status request command "40HEX", not followed by the additional data, is used for collecting the information of the recording apparatus.

Upon receiving such command of one or plural bytes, the recording apparatus returns a status signal as shown in FIG. 12. A whole status signal alone is returned in response to a command requesting an operation, such as the start command (80HEX), stop command (83HEX), or mode signation command ("01HEX", "02HEX", "04HEX", "07HEX" or "08HEX"), but all the status signals shown in FIG. 12 are returned in response to a status request command. A bit 7 of the whole status indicates whether a mode designation command or an operation request command has been accepted. Bits 6 and 5 indicate whether the printer and the reader are respectively in operation or not. Bits 4 and 3 respectively indicate whether the printer and the reader are in initialization, for example heating the fixing unit of the printer to a predetermined temperature. Bits 2 and 1 respectively indicate whether an error exists in the printer and the reader. Consequently a status "x0x0x0xxB" (B standing for binary, and x standing for not related) indicates that the printer is operable. A 2nd byte indicates the presence or absence of sheets in respective sheet feeding units, and 3rd to 7th bytes indicate the sheet sizes in the respective sheet feeding units by 8-bit codes, though the details are omitted. When the bit 2 or 1 in the 1st byte is "1", the details of the error are described by 8th to Mth bytes, though the details are omitted. In addition to the foregoing, there are other information to be exchanged for operating the recording apparatus from the external device.

FIG. 13 shows a communication flow in case of (h) shown in FIG. 10.

At first the external device designates the four-color full-color mode. The recording apparatus accepts the command and returns "80HEX" (step S1). Then the external device designates sheet feeding from the third cassette (step S2), sheet discharge to the intermediate tray (step S3), original image recording (step S4) and N-sheet recording (step S5) and starts the operation (step S6). The recording apparatus, upon accepting the start command, starts the first-face recording of the original image recording in two-side recording mode as instructed, and returns a status "E0HEX" indicating that the command has been accepted and the printer/reader are both in operation (step S6). During the recording operation, the status "E0HEX" continues as the 1st byte of the status signal in response to the status request command, but, upon completion of the recording operation, a status "80HEX" is returned whereby the external device can know the completion of the function of the recording apparatus (step S8).

Then the processing for the second side is started. After the designation of a monochromatic mode (step S9), sheet feeding from the intermediate tray (step S10), sheet discharge to the outside (step S11), recording of the image from the external device (step S12) and N-sheet recording (step S13), a start command is released, in response to which a status "C0HEX" is returned since the printer alone function this time (step S14). The image V2, supplied from the external device according to the page synchronization signal PSYNC2 from the recording apparatus, is recorded on the second side of the sheets (step S15), and, after the recording operation, an operation completion status is returned in response to the status request command (step S16). In the steps S7, S8 and S16 in FIG. 13, the "+" sign in the status signal E0HEX+ or 80HEX+ indicates the 1st and ensuing bytes which are omitted for the purpose of simplification.

It is thus rendered possible to automatically record, on both sides of the recording sheet, images from different image sources with different color mode. It is therefore possible to select a desired or optimum color mode for the image from each image source, whereby the operability of the apparatus is improved. Similarly all the recording types shown in (i) in FIG. 10 can be realized.

In the embodiment explained above, all the control operations are executed according to the instructions from the external device such as computer, but it is unnatural to request the operator to effect the operations at the external device while the original is placed on the recording apparatus. In another embodiment, a part of the setting operations is made executable in an operation unit of the recording apparatus, such as a color copying apparatus, thereby realizing a natural work flow according to the image source.

Figure 14:
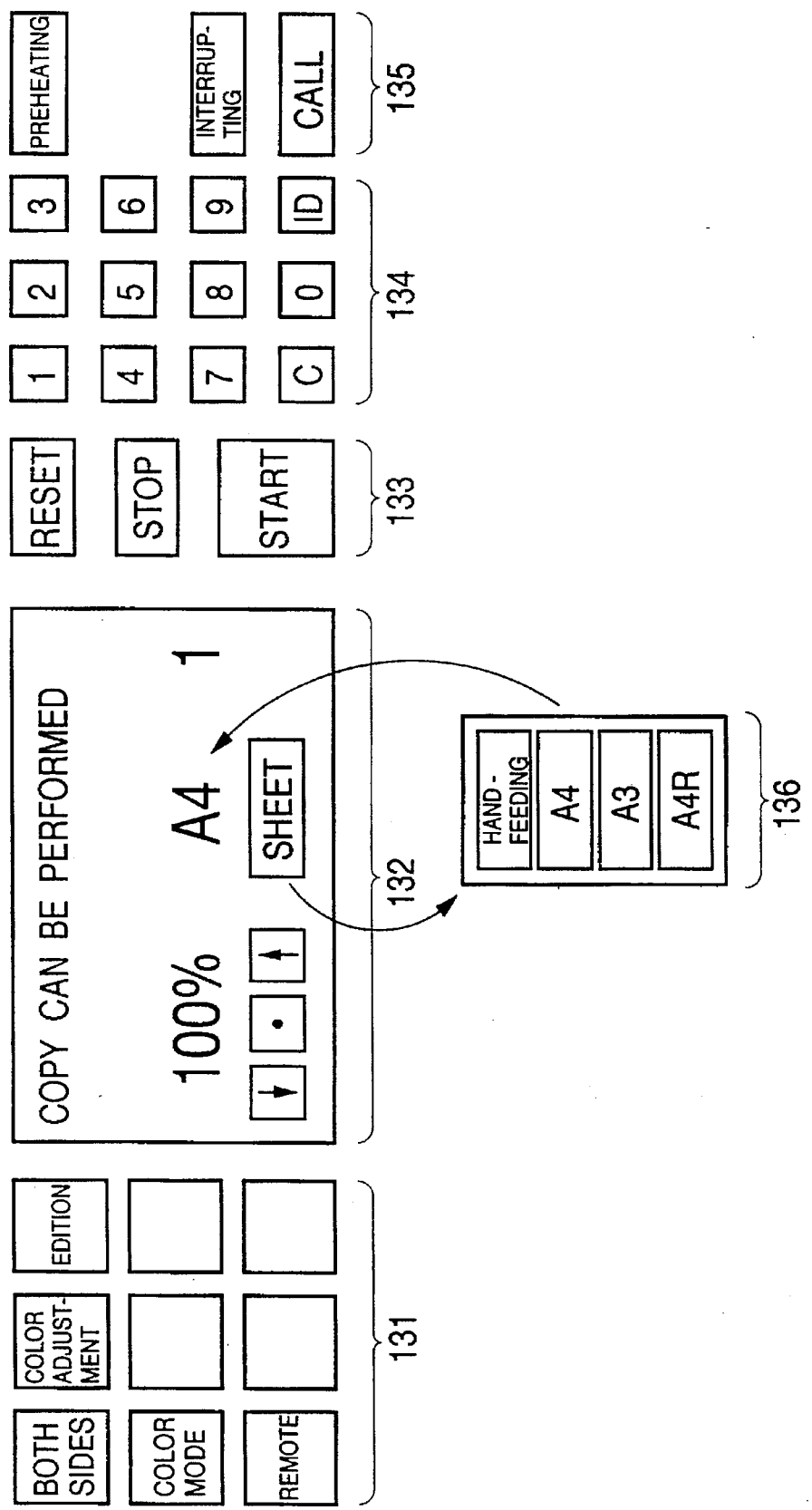
FIG. 14 is a view of an operation unit.

FIG. 14 shows an operation/display unit of the recording apparatus of the present embodiment. An introduction unit 131 is provided for mode setting. For example, for setting the two-side recording operation, a two-side key is depressed at first, and the details of the operation are set on an LCD display unit 132. There are also provided a color mode key for selecting the monochromatic (black-and-white) recording or full-color recording; a color adjustment key for adjusting the density and the hue; and an editing key for extraction, erasure or color change in a part of the image. Other functions of the key are omitted. There is also provided a remote key for selecting a "local copy" mode for the recording or the original image, namely as a copying apparatus, a "remote print" mode for recording the image from the external device, namely as a printer, or a "remote scanner" mode for sending the read image to the external device, namely as a scanner or a reader. An LCE display unit 132 is provided with a known transparent touch panel, and is composed of 640 dots in the horizontal direction and 200 in the vertical direction. In the illustrated basic display state, it indicates the image magnification, sheet size, number of sheets and status of the apparatus. The image magnification can be decreased or increased respectively by downward and upward arrow keys, and returns to 100% by a "•" key. The image magnification varies in the unit of 1% at each increase or decrease, or indicates one of fixed magnification changes defined among the sheets of standard sizes (for example 141% for a size change from A4 to A3). The number of sheets can be entered by numeral keys as will be explained later. Depression of a sheet key causes an overlapping display of a small window display 136 for selecting the sheet sizes available on the aforementioned cassettes, and depression of a desired sheet size restores the display shown in FIG. 13. A key group 133 includes a reset key for restoring a standard state for operation, a stop key for terminating the operation, and a start key for starting the operation. A key group 134 includes numeral keys for setting numerical information such as the number of sheets, a clear key for canceling such information, and an ID key for setting or canceling an ID number mode in which the operation is enabled only upon entry of a pre-registered ID number. A key group 135 includes a preheating key for setting or canceling a preheating mode for lowering the temperature of the fixing unit or temporarily turning off the display unit, an interruption key for setting or canceling an interruption mode for interrupting the job under way and executing another urgent job, and a call key for recalling, in one touch, the operation mode already executed.

FIG. 15 shows the flow, similar to FIG. 13, of the present embodiment.

At first the operation unit is used for setting the two-side recording mode (step 1), color mode (step 2), sheet size (step 3) and sheet number (step 4). During these operations, in response from the status request command from the external device, there are returned a 1st byte "80HEX" indicating that the apparatus is non-operating but operable, and a 2nd byte "000xxxx0B" indicating that the intermediate tray is empty by bit 0=0. A sign "+" indicates that additional data exist but are omitted.

Upon depression of the start key (step 5), there is conducted the recording of the original image on the first side in the two-side recording (step 6). During said step 6, in response to the status request command from the external device, a 1st byte "E0HEX" is returned to indicate the recording operation is under way. After the recording operation there is returned a status with a 1st byte "80HEX" indicating the end of recording operation and a 2nd byte "000xxxx1B" indicating the presence of sheets in the intermediate tray by bit 0=1 (step 7). Then the remote key is depressed to set image reception from the external device (step 8). In the period of the steps 1 to 7, the operator is supposed to be at the side of the recording apparatus, but, in the process starting from the step 9, the operator is supposed to often leave the location of the recording apparatus, in order to effect the necessary setting operations on the keyboard of such external device, such as a computer, while the sheets in process are retained in the intermediate tray of the recording apparatus. For this reason it is considered effect to depress the remote key, thereby reserving the reception of the external image, in order to avoid unexpected depression of the start key of the recording apparatus by any other person. However the above-mentioned step 8 may be dispensed with in case such fear does not exist. The steps 9 to 16 will not be explained further as they are similar to those shown in FIG. 13.

As explained above, there is achieved a natural flow of operations matching the process flow, by giving instructions for the original image in the recording apparatus and those for the external image in the external device. It is naturally possible, in a similar manner, to achieve a case inverse to that shown in FIG. 15, namely recording the external image on the first side by the setting in the external device and the original image on the second side by the setting in the recording apparatus.

It is also possible to set, for example the color mode for the second side in the two-side mode (step 9), sheet supply source (step 10) and sheet discharge place (step 11) in the operation unit (FIG. 14) of the recording apparatus. It is furthermore possible to designate the image source (step 12) by the remote key, also to set the sheet number (step 13) in the same manner as for the first side, and to effect the starting (step 14) with the start key. It is therefore possible, if necessary, to effect all the setting operations in the operation unit (FIG. 14) and to utilize the page synchronization signal PSYNC2 only as the trigger for extracting the image from the external device.

The embodiment explained above is designed to handle a single original only, but there can also be conceived other cases of two-side recording, for example a full-color personal photograph and personal data such as computerized personal history on respective sides, or a full-color image of a sight-seeing spot or a hotel and a computerized process or a price list on respective sides. Such two-side recording or an original image and corresponding electronic information is effective in practice.

In the following there will be explained two-side recording in case the reader unit is provided with a known document handling device (DH), with reference to FIGS. 16A and 16B.

At first the individual information A1–A5 stored in the computer C are recorded as the images of the first side in the two-side recording, and the sheets are stored in the intermediate tray. Then mutually different five originals B1–B5 set on the DH are separated in succession from the bottom side and are recorded as the images of the second side in the two-side recording, whereby the paired information Ai and Bi (i=1, 2, . . . , 5) are recorded respectively on both sides of a sheet.

Figure 17:
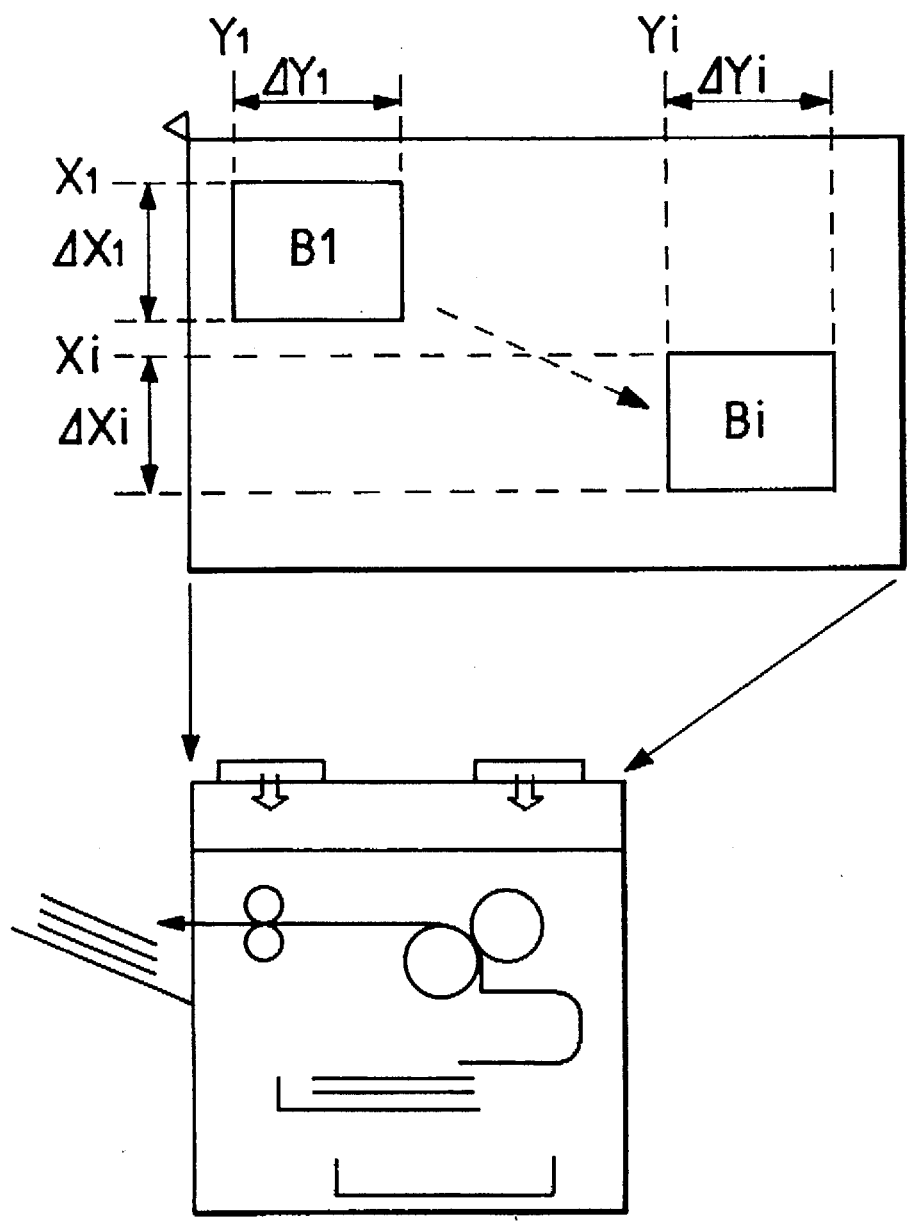
FIG. 17 is a view showing another embodiment of the present invention.

In case of two-side recording of plural original areas Bi on the original supporting glass instead of the plural original images B1–B5, said area Bi can be defined, as shown in FIG. 17, by coordinate values Xi, Yi and an area size $\Delta Xi$, $\Delta Yi$. The image recording of respectively different areas on the second side in the two-side recording mode is particularly convenient for small originals such as photographic prints. The technology for extracting and recording only a part of the original is already known and will not, therefore, be explained.

FIGS. 18A and 18B show commands and status signals newly employed in the communication protocol between the recording apparatus and the external device in this embodiment. The start command "80HEX" is different from that in FIG. 11 and has additional data, in which a bit 0=1 executes an operation of replacing the original on the DH tray, prior to the original scanning. A DH operation designation command "85HEX" designates, by additional data, either to fetch an original from the DH tray onto the glass (bit 0=1), or to discharge the original from the glass to the tray (bit 1=1), or to count the number of originals on the tray (bit 2=1). Usually, the bits 0 and 1 are simultaneously set at "1" to effect original feeding and discharge at the same time. The number of the originals identified by the original number counting operation is asked by a DH original number request command "45HEX".

A DH blank feeding designation command "86HEX" effects idle feeding of the originals, by a number indicated by the additional data. For example, if a 10th original is to be set on the glass, this command can be used for idle feeding of 9 sheets, followed by a sheet feeding. A DH status request command "43HEX" obtains the DH status, indicating the presence of DH error by a bit 0, DH Operation/non-operation state by a bit 1, presence of originals to be fed, on the tray, by a bit 2, and presence of original set by DH on the glass by a bit 3. An area designation command is used for designating an original area to be recorded, as shown in FIG. 17.

Figure 16A:
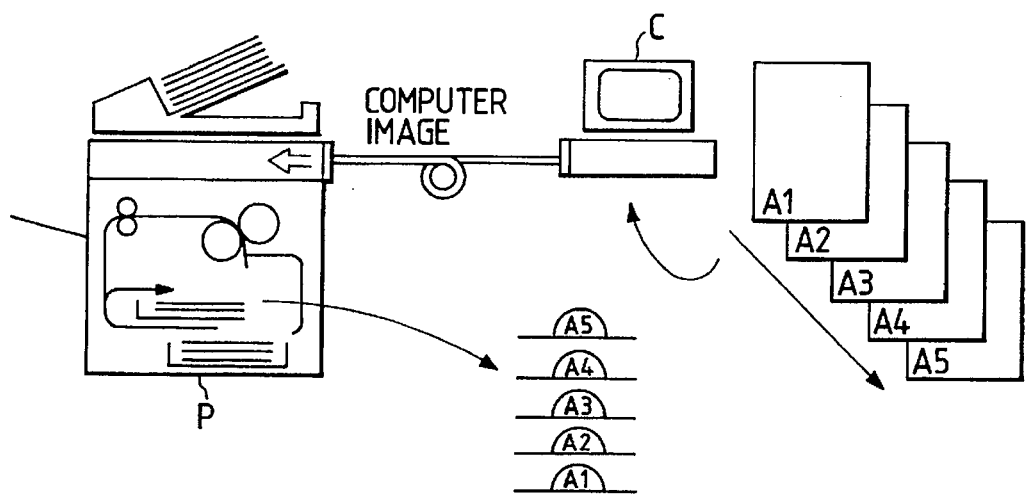
FIGS. 16A and 16B are views showing another embodiment of the present invention.
Figure 16B:
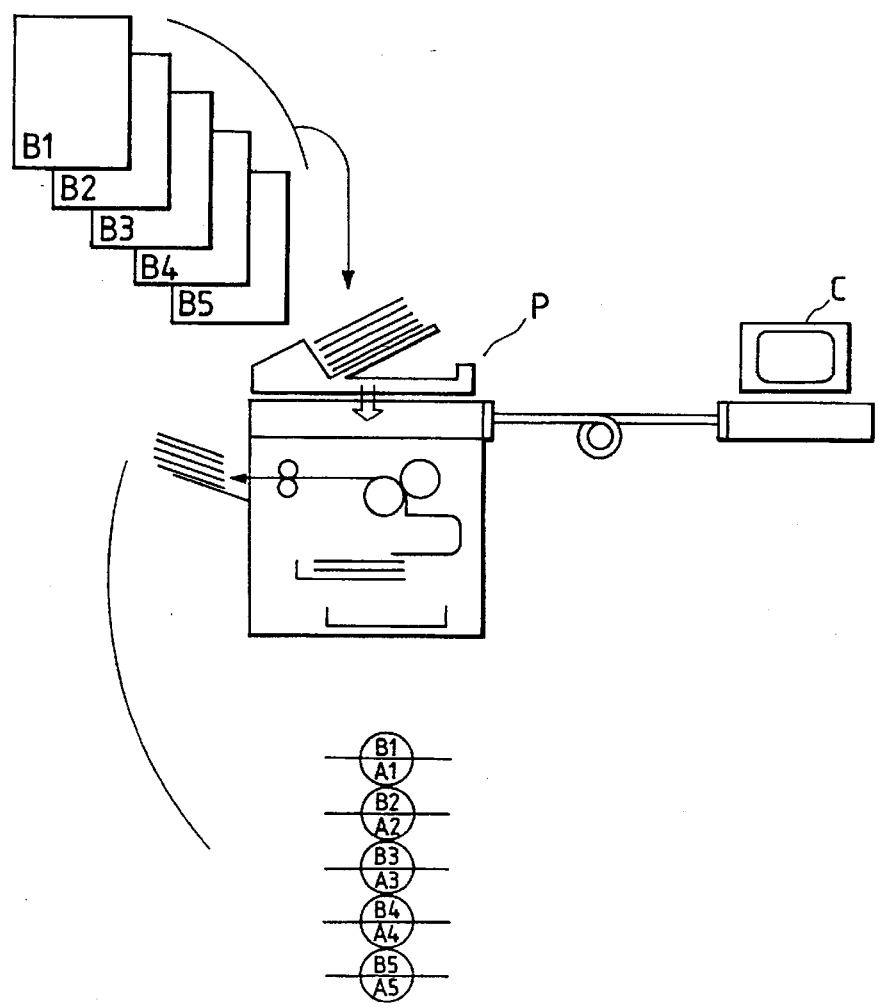
Figure 19:
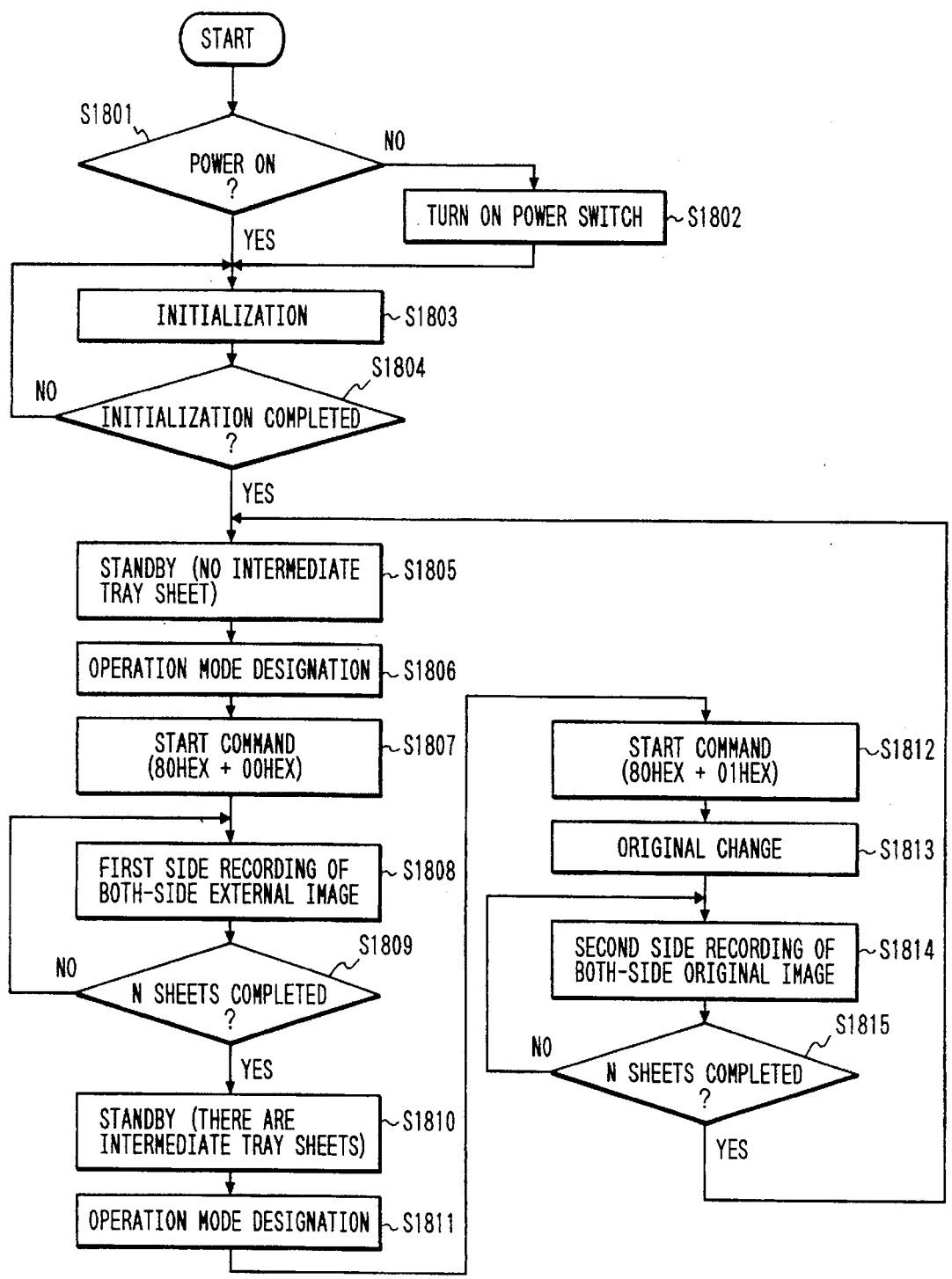
FIG. 19 is a flow chart showing the control sequence of the embodiment shown in FIGS. 9A and 9B.

FIG. 19 is a flow chart showing the control sequence in the embodiment shown in FIGS. 16A and 16B. At first a step S1801 discriminates whether the power supply to the apparatus is on, and, if not, when the power supply is turned on in a step S1802, the apparatus enters an initialization state such as warming up (step S1803). A step S1804 discriminates whether the initialization has been completed, and, if completed, the apparatus enters a stand-by state without sheet in the intermediate tray (step S1806), whereby the operation is enabled. After the operation mode (color mode, image source, sheet supply source, sheet discharge place etc.) is designated by the external device as explained in the foregoing with the aforementioned commands and protocol (step S1806), in response to the start command (step S1807), the apparatus enters the operation for recording the external image on the first side in the two-side mode (step S1808). Upon completion of the first-side recording operation for the designated sheet number N (step S1809), the apparatus enters a stand-by state retaining sheets in the intermediate tray (step S1810). Then, after the designation of the operation mode for the second side recording (step S1811), in response to the start command for original replacement by the DH immediately before the original scanning (step S1812), the apparatus enters a state of original replacement (step S1813) combined with the recording of the original image on the second side in the two-side mode (step S1814). This operation is continued for the designated sheet number N (step S1815), and the apparatus returns to the initial stand-by state.

The original replacement process in the step S1813 may be replaced by an original area renewing process as shown in FIG. 17. It is thus rendered possible to achieve recording of the images from mutually related but different image sources in automatic manner on both sides of the recording sheets, with respectively desired color mode, by employing an operation start command involving the original replacing operation by the document handler and designating the image source and the color mode independently for each of the top and bottom sides.

Figure 20A:
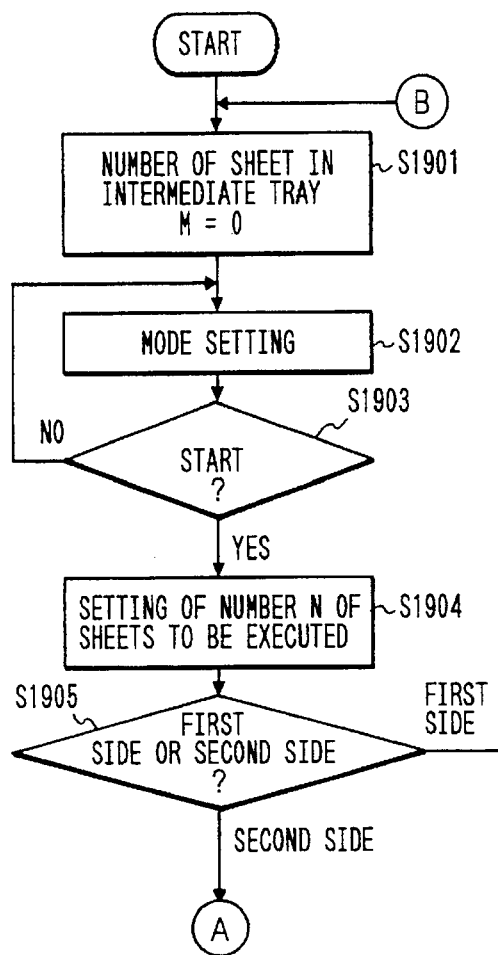
FIGS. 20A and 20B, when combined as shown in FIG. 20, show a flow chart showing an example of the control sequence in an embodiment of the present invention.
Figure 20:
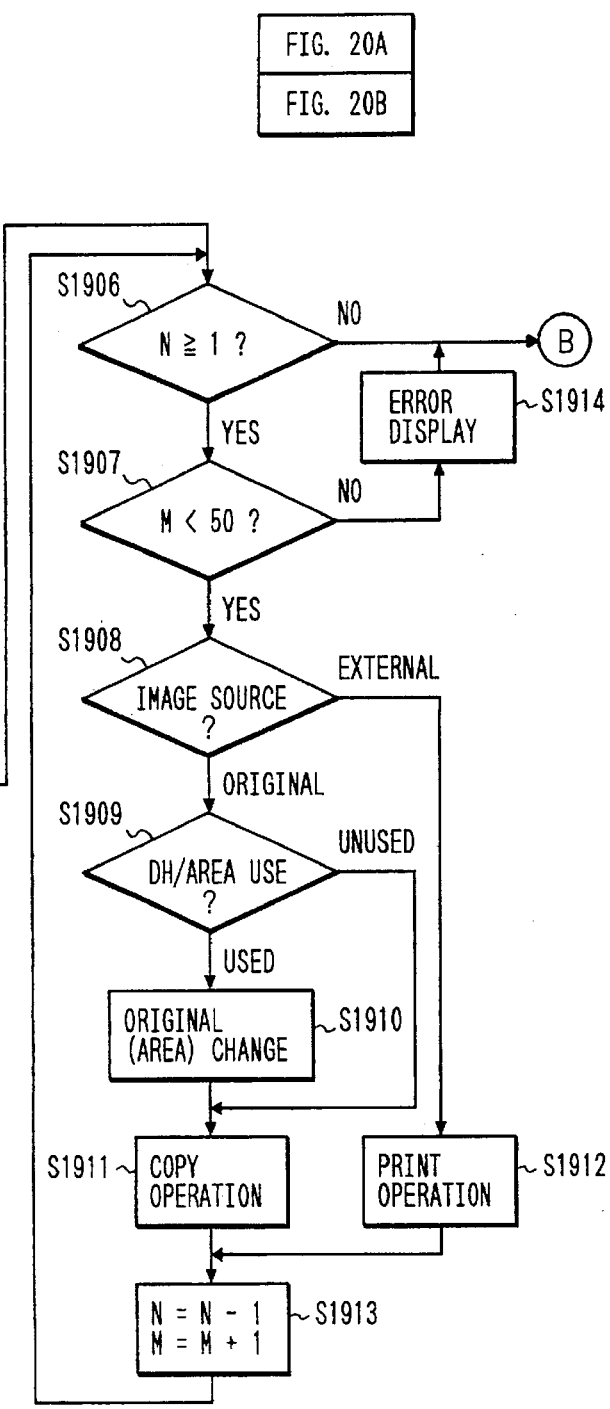
Figure 20B:
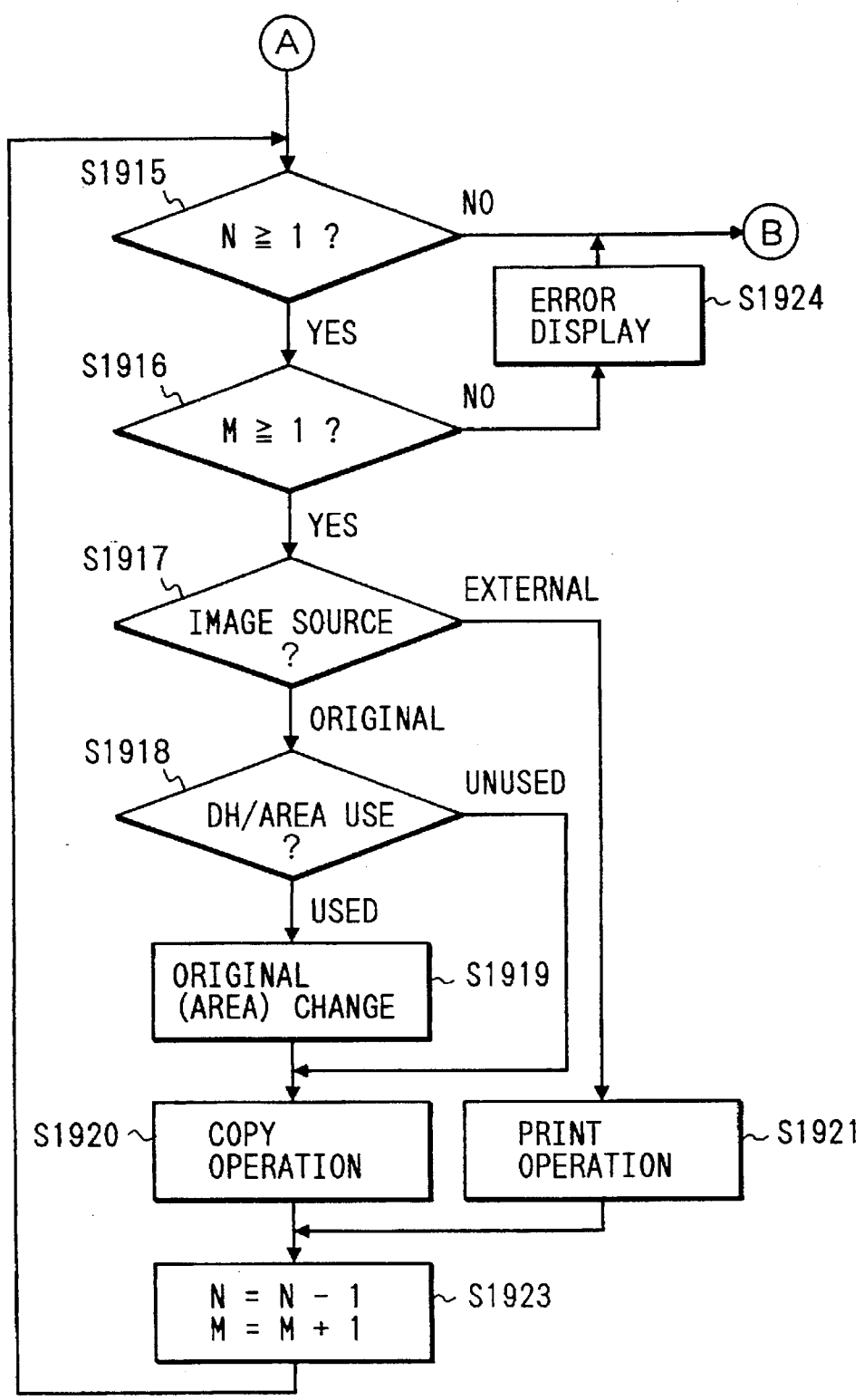

In the embodiment shown in FIGS. 16A, 16B and 19, N sheets are processed respectively for the top and bottom sides, but it is also possible, as shown in the control flow in FIGS. 20A and 20B, to vary the process (image source, sheet supply source, sheet discharge place, color mode, sheet number) at an arbitrary number of sheets. At first "0" is set in a RAM area M, indicating the sheet number in the intermediate tray (step S1901). Then the operation mode (image source, sheet supply source, sheet discharge place, color mode, sheet number) is set by the operation unit of the recording apparatus or by the commands from the external device (step S1902), and the operation is started by said operation unit or by a command (step S1903). Then a sheet number to be processed is set in a RAM area N (step S1904), and there is discriminated, based on the set mode, whether the recording is conducted on the 1st or 2nd side in the two-side recording (step S1905). A one-side recording from the cassette to the outside is naturally possible, but the explanation therefor will be omitted.

In case of the recording on the 1st side, there is discriminated whether N is at least equal to 1 (step S1906). If N is at least equal to 1, the set sheet number has not been processed yet, so that there is discriminated whether M does not exceed 50 (namely whether the intermediate tray still has remaining capacity) (step S1907). In the present embodiment, the capacity of the intermediate tray is selected as 50 sheets. If the intermediate tray is full despite that the set sheet number has not been processed, an error is indicated (step S1914) and the sequence awaits the next setting operation. Subsequent to the step S1907, the source of the image to be recorded is identified from the set mode (step S1908), and, in case of an original image, there is discriminated whether to use the DH or the original area as shown in FIG. 17 (step S1909). If used, the original or the original area is replaced (step S1910), and the copying operation (for recording the image read in the reader unit) is conducted (step S1911). If the image source is the external device, there is conducted the printing operation (by the operation of the printer unit only, without operation of the reader unit) (step S1912). After the recording of a sheet, the number N is decreased by one and the number M is increased by one (step S1913), and the sequence returns to the step S1906. The foregoing steps S1906 to S1914 respectively correspond to steps S1915 to S1924 for the second side recording, so that the different portions only will be explained in the following. A step S1916 corresponds to the step S1907, but is practicable if M is at least equal to one, since the sheet is supplied from the intermediate tray. Also the display in the error display step S1924 is modified accordingly. A step S1923 corresponds to the step S1913, but the number M is decreased by one, since the sheet is supplied from the intermediate tray also in this case.

The above-explained control enables two-side recording with completely random selection of the image source, color mode and sheet number. Consequently there can be generated documents containing the two-side recordings of 16 types, shown in (i) in FIG. 10, in completely arbitrary order and arbitrary numbers.

In the embodiment shown in FIG. 19, the recording of the external image and that of the original image are conducted sequentially, so that the original handling time becomes redundant as shown in FIG. 21A or 21C, wherein Ai and Bi respectively indicate an external image and an original image, as in FIGS. 16A and 16B. In case of FIG. 21A, after the recording of the image A5, a first original B5 is fed and the B5 image is recorded. The operations are continued thereafter in a similar manner. In case of FIG. 21C, after the recording of the external images A1 to A5, the originals are counted and idle fed to the B1 to be recorded first, and the recording of the image B1 can then be started. In these cases, the process time can be shortened by executing, as shown in FIGS. 21B and 21D, the original handling parallel to the external image recording.

In the foregoing embodiments, the CCD for reading the originals and the external device such as a computer are raised as the plural image sources, but the present invention is not limited to such example and is likewise applicable to a computer, a facsimile, or a memory device such as an optical or magnetic disk. Also there can be similarly employed three or more image sources.

Also in the foregoing embodiments, the image from the external device is received by the information of a color space corresponding to the developing colors M, C, Y and Bk, but it is also possible to receive the image in the information of RGB color space or of other color spaces, in a position X in the image flow shown in FIGS. 2a and 2B.

As explained in the foregoing, the embodiments of the present invention provide an apparatus capable of recording images from plural sources automatically on both sides of the recording sheet with different color modes, thereby simplifying the preparation of a document, consisting of plural pages containing layout of plural images in the unit of a page.

Also it is rendered possible to record a same image on the first sides of plural recording sheets and to record respectively difference images from another source on the second sides, and to automatically record paired image information respectively on both sides of plural recording sheets, so that there is improved the operability in recording the images from different sources on both sides of the plural recording sheets.

What is claimed is:

1. A recording apparatus, comprising:
   a) plural image input means for respectively entering image signals;
   b) recording means for recording first and second images, relating to the image signals entered from said plural image input means, respectively, on first and second sides of a recording medium; and
   c) manual designation means for independently designating a recording color mode of the image to be recorded by said recording means for each of said sides.

2. An apparatus according to claim 1, wherein said manual designation means is capable of setting, as said color mode, a monochromatic mode and a full-color mode.

3. An apparatus according to claim 1, further comprising:
   retention means for retaining the recording medium bearing, on a first side thereof, the first image recorded by said recording means;
   wherein said recording means is adapted to record the second image on the second side of the recording medium in said retention means, thereby achieving image recording on both sides of said recording medium.

4. An apparatus according to claim 3, further comprising:
   record control means for controlling the image recording by said recording means on the first side of said recording medium, and the image recording on the second side of the recording medium in said retention means.

5. An apparatus according to claim 4, wherein:
   said record control means controls the image recording by said recording means in such a manner as to record images, relating to a same image signal, on n pages (n≧1) on the first sides of plural recording media, and to record images, relating to a same image signal, on n pages, on the second sides of said plural recording media; and
   said manual designation means is adapted to set said color mode on said n pages.

6. An apparatus according to claim 4, wherein:
   said record control means controls the image recording by said recording means in such a manner as to record images, relating to a same image signal, on the first sides of plural recording media, and to record images, relating to a same image signal, on n pages (n≧1) on the second sides of said plural recording media in said retention means; and
   said manual designation means is adapted to set said color mode on said n pages.

7. An apparatus according to claim 4, wherein:
   said record control means controls the image recording by said recording means in such a manner as to record images, relating to a same image signal, on of n pages (n≧1) on the first sides of plural recording media, and to record images, relating to a same image signal, on the second sides of said plural recording media in said retention means; and
   said mode setting means is adapted to set said color mode on said n pages.

8. An apparatus according to claim 3, wherein:
   said plural image input means include reading means for optically reading an original image for generating an image signal, and area setting means for setting plural areas in said original image;

said record control means control the image recording by said recording means in such a manner as to record the original images of the plural areas set by said area setting means, in succession on n pages, either on the first sides of said plural recording media or on the second sides of said plural recording media in said retention means; and said manual designation means is adapted to set said color mode on said n pages.

9. An apparatus according to claim 1, wherein:

said plural image input means include means for entering said image signal from an external device.

10. An apparatus according to claim 9, further comprising:

communication means for communication with said external device;

wherein said external device is capable, through said communication means, of setting the color mode of the image to be recorded by said recording means, independently for each of said sides.

11. A recording apparatus, comprising:

a) plural image input means for respectively entering image signals;

wherein said plural image input means includes reading means for optically reading an original image and input means for entering said image signal from an external device;

b) recording means for recording images, relating to the image signals entered by said plural image input means respectively on first and second sides of a recording medium;

wherein said recording means includes retention means for retaining the recording medium bearing, on the first side thereof, the image recorded by said recording means; and said recording means is adapted to record an image on the second side of the recording medium in said retention means, thereby effecting the image recording on both sides of said recording medium;

c) record control means for controlling the image recording by said recording means so as to record images, relating to a same image signal, on n pages (n≧1) on the first sides of said plural recording media and to record images, relating to a same image signal, on n pages, on the second sides of said plural recording media in said retention means; and d) manual designation means for independently designating a recording color mode of the image to be recorded by said recording means for each of said sides;

wherein said manual designation means is adapted to vary said color mode on said n pages.

12. An image recording system comprising:

a recording apparatus including:

a) plural image input means for respectively entering image signals; and b) recording means for recording images, relating to the image signals entered by said plural image input means, respectively on first and second sides of a recording medium; and an image supplying apparatus including:

a) supply means for supplying said recording apparatus with an image signal:

wherein said plural image input means includes means for entering the image signal from said supply means; and b) manual designation means for independently designating a color mode of the image to be recorded by said recording means for each of said sides.

13. A system according to claim 12, wherein:

said plural image input means includes reading means for optical reading an original image for forming an image signal, and said recording means is adapted to record an image relating to the image signal from said reading means and an image relating to the image signal from said supply means, selectively on said recording medium.

14. A system according to claim 12, further comprising:

wherein said recording apparatus further includes second manual designation means for independently designating the color mode of the image to be recorded by said recording means for each of said sides; and said color mode can be set by said manual designating means or by said second manual designation means.

15. An image supply apparatus for supplying an image signal to a recording apparatus for entering image signals from plural sources and recording images relating to said image signals on first and second sides of a recording medium, comprising:

image supply means for supplying said recording apparatus with an image signal; and manual designation means for independently designating a recording color mode of the image to be recorded by said recording apparatus for each of said sides.

16. An apparatus according to claim 15, wherein:

said image supply means is adapted to supply said image signal so as to enable recording of images, relating to a same image signal, on n pages (n≧1) on the first or second sides of a plurality of said recording media.

17. An apparatus according to claim 16, wherein:

said manual designation means is capable of setting said color mode in the unit of said n pages.

18. A recording method comprising steps of:

a) entering plural image signals from an external device;

b) recording images, relating to the entered plural image signals, respectively on first and second sides of a recording medium;

c) manually designating a recording color mode of the image to be recorded by said recording means independently for each of said sides; and effecting communication with said external device, wherein said external device is capable of setting, by said communication step, the color recording mode of the image to be recorded in said recording step, independently for each of said sides.

19. A method according to claim 18, wherein:

said color mode includes a monochromatic mode and a full color mode.

20. A method according to claim 18, further comprising a step of:

retaining the recording medium bearing, on the first side thereof, an image recorded in said recording step;

wherein the image recording on both sides of said recording medium is achieved by recording an image on the second side of the retained recording medium.

21. A method according to claim 20, further comprising a step of:

controlling the image recording, in said recording step, on the first side of said recording medium, and the image recording on the second side of said retained recording medium.

22. A method according to claim 21, wherein said control step controls said image recording step in such a manner as to record images, relating to a same image signal, on n pages (n≧1) on the first sides of said plural recording media, and to record images, relating to a same image signal, on n pages, on the second sides of said retained plural recording media; and said color mode is settable on said n pages.

23. A method according to claim 21, wherein said control step controls said image recording step in such a manner as to record images, relating to a same image signal, on the first sides of said plural recording media, and to record images, relating to a same image signal, on n pages (n≧1) on the second sides of said retained plural recording media; and said color mode is settable on said n pages.

24. A method according to claim 21, wherein said control step control said image recording step in such a manner as to record images, relating to a same image signal, on n pages (n≧1) on the first sides of said plural recording media, and to record images, relating to a same image signal, on the second sides of said retained plural recording media; and said color mode is settable on said n pages.

25. A method according to claim 20, wherein said image input step includes a step for optically reading an original image and forming an image signal, and a step for setting plural areas in said original image; and said control step controls said image recording step in such a manner as to record original images of the plural areas set by said area setting step, in succession on n pages, on the first sides of said plural recording media or on the second sides of said retained plural recording media; and said color mode is settable on said n pages.

* * * * *

UNITED STATES PATENT AND TRADEMARK OFFICE
CERTIFICATE OF CORRECTION

PATENT NO. : 5,659,386
DATED : August 19, 1997
INVENTOR(S) : Masanori YAMADA

Page 1 of 2

It is certified that error appears in the above-identified patent and that said Letters Patent is hereby corrected as shown below:

Column 1, line 16, after "having", insert --an--;
    Line 17, delete "an".

Column 4, line 8, after "In", insert --the--;
    Line 21, after "material,", insert --a--.

Column 6, line 27, delete "SPYNC" and insert therefor --PSYNC--;
    Line 40, delete "SPUNC2" and insert therefor -- PSYNC2 --

Column 7, line 49, after "to", insert --be--.

Column 8, line 42, delete "are" and insert therefor --is--;

Column 11, line 10, delete "or" and insert therefor --of--;
    Line 58, delete "Operation" and insert therefor --operation--.

UNITED STATES PATENT AND TRADEMARK OFFICE
CERTIFICATE OF CORRECTION

PATENT NO. : 5,659,386
DATED : August 19, 1997
INVENTOR(S) : Masanori YAMADA

It is certified that error appears in the above-identified patent and that said Letters Patent is hereby corrected as shown below:

Column 12, line 30, after "in", insert --an--.

Column 13, line 66, delete "difference" and insert therefor --different--.

Column 14, line 57, delete "of".

Column 15, line 3, delete "control" and insert therefor --controls--. (2nd occurr.)

Column 17, line 17, delete "control" and insert therefor --controls--.

Signed and Sealed this

Thirty-first Day of March, 1998

Attest:

BRUCE LEHMAN

*Attesting Officer*    *Commissioner of Patents and Trademarks*